(12) United States Patent
Kawai et al.

(10) Patent No.: US 10,412,352 B2
(45) Date of Patent: Sep. 10, 2019

(54) PROJECTOR APPARATUS WITH DISTANCE IMAGE ACQUISITION DEVICE AND PROJECTION MAPPING METHOD

(71) Applicant: FUJIFILM Corporation, Tokyo (JP)

(72) Inventors: Tomoyuki Kawai, Saitama (JP); Yoshinori Furuta, Saitama (JP); Tomonori Masuda, Saitama (JP); Junya Kitagawa, Saitama (JP); Yasuhiro Shinkai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 15/899,760

(22) Filed: Feb. 20, 2018

(65) Prior Publication Data

US 2018/0184056 A1 Jun. 28, 2018

Related U.S. Application Data

(63) Continuation of application No. PCT/JP2016/067944, filed on Jun. 16, 2016.

(30) Foreign Application Priority Data

Aug. 28, 2015 (JP) ................................. 2015-169546

(51) Int. Cl.
  *H04N 9/31* (2006.01)
  *G01S 7/481* (2006.01)
  (Continued)

(52) U.S. Cl.
  CPC ........... *H04N 9/317* (2013.01); *G01S 7/4814* (2013.01); *G01S 7/4816* (2013.01); *G01S 17/10* (2013.01);
  (Continued)

(58) Field of Classification Search
  CPC .... H04N 9/317; H04N 9/3194; H04N 9/3147; G01S 7/4814; G01S 7/4816; G01S 7/484;
  (Continued)

(56) References Cited

U.S. PATENT DOCUMENTS

| 2009/0153752 A1 | 6/2009 | Silverstein |
| 2011/0181704 A1 | 7/2011 | Gordon et al. |

(Continued)

FOREIGN PATENT DOCUMENTS

| CN | 101889233 A | 11/2010 |
| CN | 102510461 A | 6/2012 |

(Continued)

OTHER PUBLICATIONS

Japanese Notification of Reasons for Refusal for Japanese Application No. 2017-537602, dated Apr. 22, 2019, with English translation.

(Continued)

*Primary Examiner* — Allen C Wong
(74) *Attorney, Agent, or Firm* — Birch, Stewart, Kolasch & Birch, LLP

(57) ABSTRACT

The invention provides a projector apparatus with a distance image acquisition device and a projection mapping method that can project an image focused on the entire projection object even in a case in which there is a difference in distance to the projection object and the projection object moves. Two projector apparatuses with a TOF camera, that is, a first projector apparatus with a TOF camera including a first projector apparatus for a far distance and a first TOF camera that acquires a distance image of a far projection object and a second projector apparatus with a TOF camera including a second projector apparatus for a near distance and a second TOF camera that acquires a distance image of a near projection object can project a projection image for a (Continued)

far distance and a projection image for a near distance which are focused on the entire projection object even in a case in which there is a difference in distance to the projection object and the projection object moves. In addition, a first light source and a second light source of the projector apparatuses are pulse-driven to function as light sources of the first and second TOF cameras.

14 Claims, 17 Drawing Sheets

(51) Int. Cl.
*G01S 17/10* (2006.01)
*G03B 21/53* (2006.01)
*G01S 17/87* (2006.01)
*G01S 17/89* (2006.01)
G01S 7/484 (2006.01)

(52) U.S. Cl.
CPC .............. *G01S 17/87* (2013.01); *G01S 17/89* (2013.01); *G03B 21/53* (2013.01); *H04N 9/3147* (2013.01); *H04N 9/3194* (2013.01); *G01S 7/484* (2013.01); *G03B 2206/00* (2013.01); *G09G 2320/0261* (2013.01); *G09G 2320/0693* (2013.01)

(58) Field of Classification Search
CPC .......... G01S 17/89; G01S 17/87; G01S 17/10; G03B 21/53; G03B 2206/00; G09G 2320/0693; G09G 2320/0261
USPC .......................................... 348/135
See application file for complete search history.

(56) References Cited

U.S. PATENT DOCUMENTS

| | | | |
|---|---|---|---|
| 2012/0075534 | A1 | 3/2012 | Katz et al. |
| 2012/0176476 | A1* | 7/2012 | Schmidt ................. G01S 17/89 348/46 |
| 2012/0268567 | A1 | 10/2012 | Nakazato et al. |
| 2016/0119602 | A1* | 4/2016 | Yushiya ............... H04N 9/3185 |

FOREIGN PATENT DOCUMENTS

| | | | |
|---|---|---|---|
| CN | 102763132 A | 10/2012 |
| JP | 2000-266852 A | 9/2000 |
| JP | 2005-140685 A | 6/2005 |
| JP | 2007-156325 A | 6/2007 |
| JP | 2011-510333 A | 3/2011 |
| JP | 2011-221060 A | 11/2011 |
| JP | 2011-243862 A | 12/2011 |
| JP | 2012-504771 A | 2/2012 |
| JP | 2013-546222 A | 12/2013 |

OTHER PUBLICATIONS

Chinese Office Action and Search Report dated Dec. 25, 2018 for Application No. 201680049622.0, along with an English translation.
International Preliminary Report on Patentability and Written Opinion of the International Searching Authority (Forms PCT/IB/326, PCT/IB/373 and PCT/ISA/237) for International Application No. PCT/JP2016/067944, dated Mar. 15, 2018, with English translation.
International Search Report (Form PCT/ISA/210) for International Application No. PCT/JP2016/067944, dated Sep. 6, 2016, with English translation.

* cited by examiner

PROJECTOR APPARATUS WITH DISTANCE IMAGE ACQUISITION DEVICE AND PROJECTION MAPPING METHOD

CROSS-REFERENCE TO RELATED APPLICATIONS

The present application is a Continuation of PCT International Application No. PCT/JP2016/067944 filed on Jun. 16, 2016 claiming priority under 35 U.S.C § 119(a) to Japanese Patent Application No. 2015-169546 filed on Aug. 28, 2015. Each of the above applications is hereby expressly incorporated by reference, in their entirety, into the present application.

BACKGROUND OF THE INVENTION

1. Field of the Invention

The present invention relates to a projector apparatus with a distance image acquisition device and a projection mapping method, and more particularly, to a technique that projects an image according to the surface of an arbitrary projection object such as a moving body or a building.

2. Description of the Related Art

A time-of-flight (TOF) camera has been known as a camera that acquires an image while acquiring distance information. The TOF camera measures the time (time of flight) until light is emitted to an object and reflected light is received by an image sensor to calculate a distance image (depth data) indicating the distance to the object.

In addition, a technique has been known in which a projector apparatus projects an image according to the three-dimensional shape of a projection object and is referred to as, for example, projection mapping or video mapping.

Furthermore, a technique has been proposed in which a TOF camera is used as a device for acquiring a distance image of a projection object and is integrated with a projector apparatus to reduce the size of a projection mapping apparatus (JP2013-546222A).

In particular, the projector apparatus disclosed in JP2013-546222A is characterized in that the projector apparatus emits an image for projection as pulsed light and a light source and a projection lens of the projector apparatus function as a light source and a projection lens of the TOF camera.

SUMMARY OF THE INVENTION

However, in the projection mapping, in a case in which there is a difference in distance to the projection object, it is difficult to project an image focused on the entire projection object. It is difficult to project a clear image to the surface of the projection object having a distance difference (three-dimensional projection object) using one projector apparatus.

In contrast, a plurality of projector apparatuses whose focus has been adjusted to different projection distances (that is, which have different depths of field) individually project an image corresponding to the distance of a projection object. In this way, it is possible to project the image focused on the entire projection object having a distance difference.

However, in the projector apparatus disclosed in JP2013-546222A, in a case in which a plurality of projector apparatuses with different depths of field are prepared and individually project the image corresponding to the distance of the projection object as pulsed light, the TOF camera receives the individually projected pulsed light components which interfere with each other. As a result, it is difficult for the TOF camera to acquire a distance image.

The invention has been made in view of the above-mentioned problems and an object of the invention is to provide a projector apparatus with a distance image acquisition device and a projection mapping method that can project an image focused on the entire projection object even in a case in which there is a difference in distance to the projection object and the projection object moves, can omit, for example, a light source for only a TOF method in a case in which a distance image is particularly acquired by the TOF method, and can acquire a distance image with high accuracy of measurement without interference.

In order to achieve the object, a projector apparatus with a distance image acquisition device according to an aspect of the invention includes: a first projector apparatus including a first display optical element that displays a first projection image, a first light source that emits projection light to be incident on the first display optical element, a first projection lens that projects a first projection image emitted from the first display optical element to a first projection object, and a first bandpass optical filter that is provided on a projection optical path and has a transmission wavelength range of red, green, and blue; a first distance image acquisition device including a first distance image sensor including a plurality of light-receiving elements which are two-dimensionally arranged, a first imaging lens that forms the first projection image reflected from the first projection object on the first distance image sensor, a second bandpass optical filter that is provided on an imaging optical path and has the same characteristics as the first bandpass optical filter, and a first distance image generation unit that pulse-drives the first light source, acquires first information corresponding to a time of flight of pulsed light, which is emitted from the first light source, is reflected from the first projection object, and is incident on the first distance image sensor, from the first distance image sensor, and generates a first distance image on the basis of the acquired first information; a second projector apparatus including a second display optical element that displays a second projection image, a second light source that emits projection light to be incident on the second display optical element, a second projection lens that projects a second projection image emitted from the second display optical element to a second projection object closer than the first projection object, and a third bandpass optical filter that is provided on a projection optical path and has a transmission wavelength range of red, green, and blue which does not overlap the transmission wavelength range of the first bandpass optical filter; and a second distance image acquisition device including a second distance image sensor including a plurality of light-receiving elements which are two-dimensionally arranged, a second imaging lens that forms the second projection image reflected from the second projection object on the second distance image sensor, a fourth bandpass optical filter that is provided on an imaging optical path and has the same characteristics as the third bandpass optical filter, and a second distance image generation unit that pulse-drives the second light source, acquires second information corresponding to a time of flight of pulsed light, which is emitted from the second light source, is reflected from the second projection object, and is incident on the second distance image sensor, from the second distance image sensor, and generates a second distance image on the basis of the acquired second information.

According to an aspect of the invention, two projector apparatuses with a distance image acquisition device, that is, a projector apparatus with a distance image acquisition device including the first projector apparatus that projects the first projection image to the first projection object and the first distance image acquisition device that acquires the first distance image of the first projection object and a projector apparatus with a distance image acquisition device including the second projector apparatus that projects the second projection image to the second projection object closer than the first projection object and the second distance image acquisition device that acquires the second distance image of the second projection object can project the first and second projection images focused on the first and second projection objects located at different distances. In addition, the first light source of the first projector apparatus and the second light source of the second projector apparatus are pulse-driven. Therefore, the first and second light sources and the first and second projection lenses can function as the light sources and the projection lenses of the first and second distance image acquisition devices. Therefore, it is possible to reduce the size and cost of the apparatus. Furthermore, the first bandpass optical filter having the transmission wavelength range of red, green, and blue in the first projector apparatus has the same characteristics as the second bandpass optical filter in the first distance image acquisition device. The third bandpass optical filter in the second projector apparatus has the same characteristics as the fourth bandpass optical filter in the second distance image acquisition device. The transmission wavelength range of the first and second bandpass optical filters does not overlap the transmission wavelength range of the third and fourth bandpass optical filters. Therefore, the first and second distance image sensors receive pulsed light components corresponding to the first and second projection images without interference and it is possible to measure the first and second distance images with high accuracy.

In the projector apparatus with a distance image acquisition device according to another aspect of the invention, preferably, the first bandpass optical filter and the second bandpass optical filter have a wider transmission wavelength range than the third bandpass optical filter and the fourth bandpass optical filter. With this configuration, the amount of light emitted as the first projection image for a far distance can be more than the amount of light emitted as the second projection image for a near distance.

In the projector apparatus with a distance image acquisition device according to still another aspect of the invention, preferably, integral sensitivity obtained by multiplying transmittance of the first bandpass optical filter by spectral sensitivity of the first distance image sensor is higher than integral sensitivity obtained by multiplying transmittance of the third bandpass optical filter by spectral sensitivity of the second distance image sensor. With this configuration, it is possible to prevent an increase in the difference between the output of the first distance image sensor used to generate the first distance image for a far distance and the output of the second distance image sensor used to generate the second distance image for a near distance (to uniformize the accuracy of measurement).

In the projector apparatus with a distance image acquisition device according to yet another aspect of the invention, preferably, a first focus range of the first projection lens is farther than a second focus range of the second projection lens. With this configuration, it is possible to project a focused image from a near distance to a far distance.

In the projector apparatus with a distance image acquisition device according to still yet another aspect of the invention, preferably, the first focus range and the second focus range are continuous or partially overlap each other. With this configuration, it is possible to project a focused image in the overall distance range even in a case in which the distance of a measurement target object changes continuously.

In the projector apparatus with a distance image acquisition device according to yet still another aspect of the invention, preferably, the first projector apparatus further includes a first focus adjustment unit that adjusts the focus of the first projection lens according to the first distance image acquired by the first distance image acquisition device and the second projector apparatus further includes a second focus adjustment unit that adjusts the focus of the second projection lens according to the second distance image acquired by the second distance image acquisition device. With this configuration, it is possible to project a focused image (the first and second projection images) according to the distance of the projection object (the first and second projection objects).

In the projector apparatus with a distance image acquisition device according to still yet another aspect of the invention, preferably, the first projector apparatus further includes a first projection image generation unit that generates the first projection image which is projected to the first projection object and in which a portion other than a region corresponding to the first projection object is a black image on the basis of the first distance image and the second projector apparatus further includes a second projection image generation unit that generates the second projection image which is projected to the second projection object and in which a portion other than a region corresponding to the second projection object is a black image on the basis of the second distance image. With this configuration, it is possible to separate the projection regions of the first projection image and the second projection image and to project a focused image from a far distance to a near distance.

In the projector apparatus with a distance image acquisition device according to yet still another aspect of the invention, preferably, the first projection image generation unit and the second projection image generation unit generate the first projection image and the second projection image such that a portion of the first projection image other than the black image and a portion of the second projection image other than the black image overlap each other at a boundary portion between the first projection object and the second projection object, respectively, and generates the first projection image and the second projection image such that brightness of the boundary portion in which the first projection image and the second projection image overlap each other is reduced by half, respectively. With this configuration, it is possible to measure the distance to the boundary portion in which the first projection image and the second projection image overlap each other and to prevent the brightness of the boundary portion from being high.

In the projector apparatus with a distance image acquisition device according to still yet another aspect of the invention, preferably, the first projector apparatus further includes a first projection image generation unit that generates the first projection image, in which brightness of an image corresponding to the boundary portion of the first projection image is continuously reduced and the image becomes a black image, on the basis of the first distance image, in a case in which a distance to the boundary portion between the first projection object and the second projection object changes continuously. Preferably, the second projector apparatus further includes a second projection image generation unit that generates the second projection image, in which brightness of an image corresponding to the boundary portion of the second projection image is continuously reduced and the image becomes a black image, on the basis of the second distance image. With this configuration, it is possible to measure the distance to the boundary portion in which the first projection image and the second projection image overlap each other and to smoothly connect the first projection image and the second projection image in the boundary portion even in a case in which the distance to the boundary portion changes continuously.

Preferably, the projector apparatus with a distance image acquisition device according to yet still another aspect of the invention further includes a triangulation unit that measures a distance longer than a distance that is capable of being acquired by the first distance image acquisition device on the basis of a triangulation method using an output from the first distance image sensor and an output from the second distance image sensor. Since two distance image acquisition devices, that is, the first and second distance image acquisition devices are used, it is possible to apply the triangulation method to the measurement of the distance of a measurement target object. Therefore, it is possible to measure the distance to a far object which is not capable of being measured by the first distance image acquisition device.

Preferably, the projector apparatus with a distance image acquisition device according to still yet another aspect of the invention further includes: a distance measurement mode selection unit that selects a static distance measurement mode; and a control unit that directs at least one of the first projector apparatus or the second projector apparatus to emit an amount of pulsed light that is uniform on the entire screen to the projection object and directs at least one of the first distance image acquisition device or the second distance image acquisition device to acquire the first distance image and the second distance image of the first projection object and the second projection object, before the first projector apparatus and the second projector apparatus project the first projection image and the second projection image, respectively, in a case in which the static distance measurement mode is selected. With this configuration, it is possible to accurately measure the distance to the projection object (the first and second projection objects) that is at a standstill.

Preferably, the projector apparatus with a distance image acquisition device according to yet still another aspect of the invention further includes: a distance measurement mode selection unit that selects a dynamic distance measurement mode; and a control unit that directs the first projector apparatus and the second projector apparatus to continuously emit the first projection image and the second projection image as pulsed light to the first projection object and the second projection object, respectively, and directs the first distance image acquisition device and the second distance image acquisition device to continuously acquire the first distance image and the second distance image, respectively, in a case in which the dynamic distance measurement mode is selected. With this configuration, even in a case in which the projection object (the first and second projection objects) is a moving body, it is possible to acquire the distance image of the moving body while projecting the images (the first and second projection images) to the moving body.

In the projector apparatus with a distance image acquisition device according to still yet another aspect of the invention, preferably, each of the first to fourth bandpass optical filters has a transmission wavelength range of three primary colors of blue with a wavelength that is equal to or less than 480 nm, green with a wavelength that is equal to or greater than 500 nm and equal to or less than 580 nm, and red with a wavelength that is equal to or greater than 590 nm. With this configuration, it is possible to project a projection image of three primary colors of visible light and to receive reflected light.

The invention according to another aspect provides a projection mapping method using a projector apparatus with a distance image acquisition device including a first projector apparatus that projects a first projection image so as to be focused on a first projection object in a first focus range, a first distance image acquisition device that acquires first information which corresponds to a distance of the first projection object and corresponds to a time of flight of light to the first projection object and generates a first distance image on the basis of the acquired first information, a second projector apparatus that projects a second projection image so as to be focused on a second projection object in a second focus range closer than the first focus range, and a second distance image acquisition device that acquires second information which corresponds to a distance of the second projection object and corresponds to a time of flight of light to the second projection object and generates a second distance image on the basis of the acquired second information. The projection mapping method includes: a step of pulse-driving a first light source of the first projector apparatus to project the first projection image through a first bandpass optical filter having a transmission wavelength range of red, green, and blue; a step of pulse-driving a second light source of the second projector apparatus to project the second projection image through a third bandpass optical filter having a transmission wavelength range of red, green, and blue which does not overlap the transmission wavelength range of the first bandpass optical filter; a step of allowing the first distance image acquisition device to receive light reflected from the first projection object, which is reflected light with respect to the projected first projection image, through a second bandpass optical filter having the same characteristics as the first bandpass optical filter and to generate a first distance image corresponding to a distance of the first projection object; a step of allowing the second distance image acquisition device to receive light reflected from the second projection object, which is reflected light with respect to the projected second projection image, through a fourth bandpass optical filter having the same characteristics as the third bandpass optical filter and to generate a second distance image corresponding to a distance of the second projection object; a step of allowing the first projector apparatus to generate the first projection image which is projected to the first projection object and in which a portion other than a region corresponding to the first projection object is a black image on the basis of the first distance image; and a step of allowing the second projector apparatus to generate the second projection image which is projected to the second projection object and in which a portion other than a region corresponding to the second projection object is a black image on the basis of the second distance image. The first distance image acquisition device and the second distance image acquisition device continuously generate the first distance image and the second distance image, respectively. The first projector apparatus and the second projector apparatus continuously generate the first projection image and the second projection image, on the basis of the continuously generated first and second distance images, and project the continuously generated first and second projection images to the first projection object and the second projection object, respectively.

According to the invention, it is possible to project an image focused on the entire projection object even in a case in which there is a difference in distance to the projection object, to omit a light source and a projection lens for only a TOF method in a case in which a distance image is particularly acquired by the TOF method, to reduce the size and cost of the apparatus, and to acquire a distance image with high accuracy of measurement without interference.

DESCRIPTION OF THE PREFERRED EMBODIMENTS

Hereinafter, embodiments of a projector apparatus with a distance image acquisition device and a projection mapping method according to the invention will be described with reference to the accompanying drawings.

[Outward Appearance of Projector Apparatus with Distance Image Acquisition Device]

Figure 1:
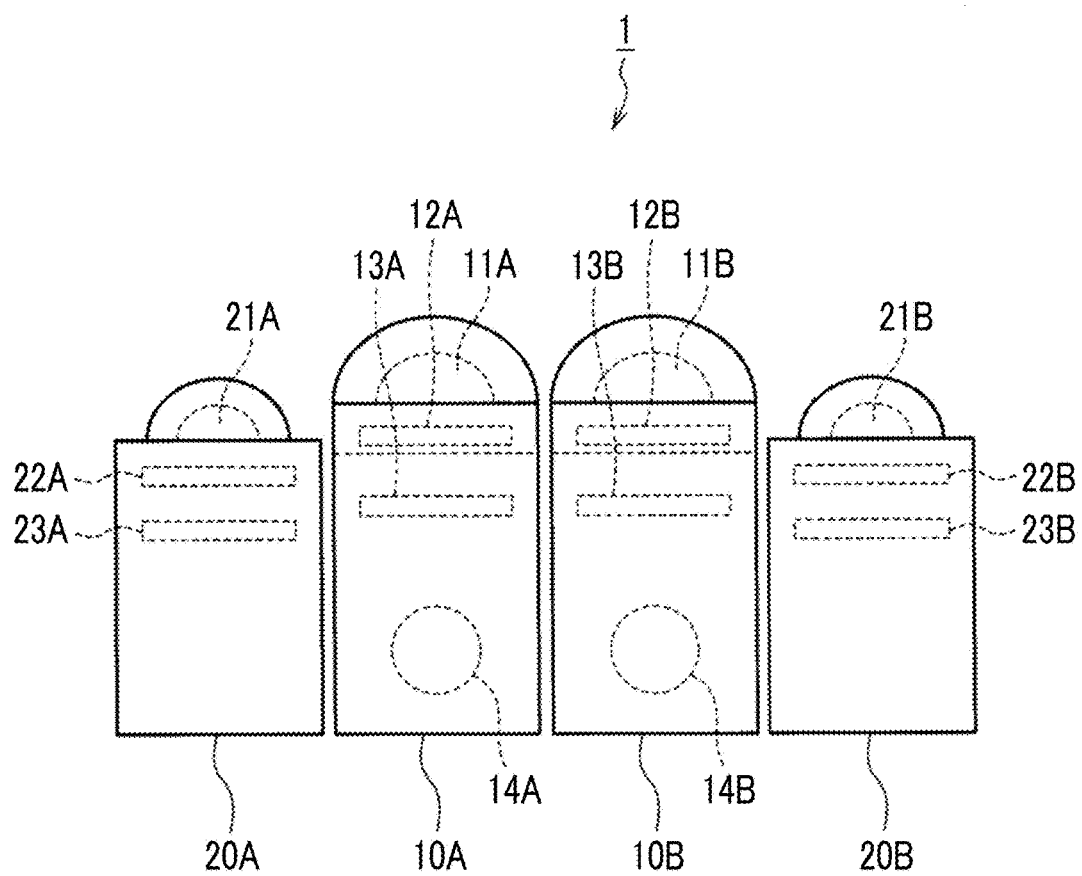
FIG. 1 is a plan view illustrating the outward appearance of a projector apparatus with a distance image acquisition device according to the invention.

FIG. 1 is a plan view illustrating the outward appearance of the projector apparatus with a distance image acquisition device according to the invention.

A projector apparatus 1 with a distance image acquisition device includes two projector apparatuses with a time-of-flight (TOF) camera, that is, a first projector apparatus with a TOF camera including a first projector apparatus 10A and a first distance image acquisition device (first TOF camera) 20A and a second projector apparatus with a TOF camera including a second projector apparatus 10B and a second distance image acquisition device (second TOF camera) 20B).

The first projector apparatus with a TOF camera projects a projection image for a far distance (first projection image) to a far projection object (first projection object) and acquires a three-dimensional distance image of the first projection object. The second projector apparatus with a TOF camera projects a projection image for a near distance (second projection image) to a near projection object (second projection object) and acquires a three-dimensional distance image of the second projection object.

The first projector apparatus with a TOF camera and the second projector apparatus with a TOF camera are electrically connected to each other, which will be described below. However, the first projector apparatus with a TOF camera and the second projector apparatus with a TOF camera may be integrated with each other or may be configured so as to be separated from each other.

[Internal Configuration of Projector Apparatus with Distance Image Acquisition Device]

Figure 2:
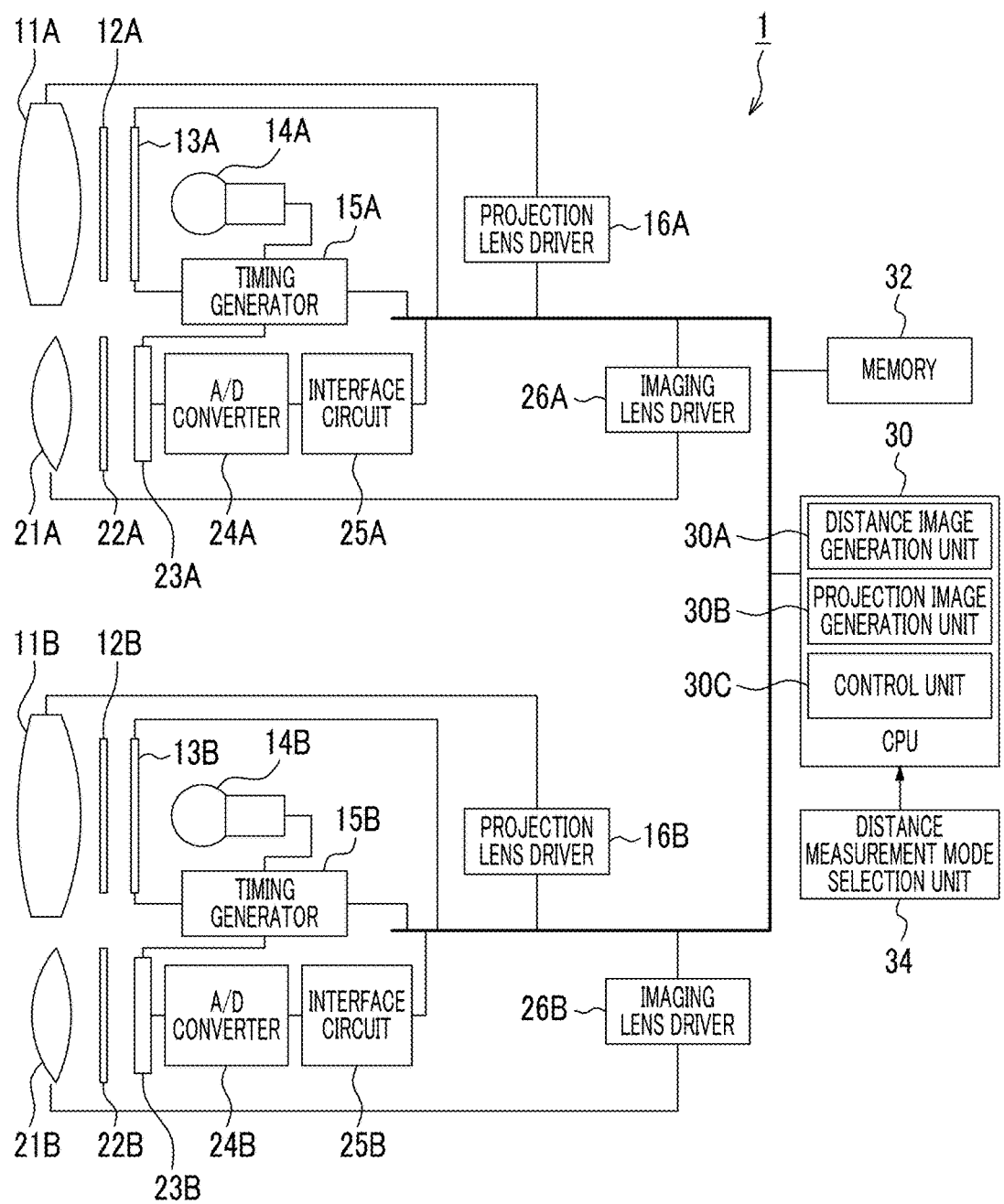
FIG. 2 is a block diagram illustrating an example of the internal configuration of the projector apparatus with a distance image acquisition device illustrated in FIG. 1.

FIG. 2 is a block diagram illustrating an example of the internal configuration of the projector apparatus 1 with a distance image acquisition device.

As illustrated in FIGS. 1 and 2, the first projector apparatus 10A forming the first projector apparatus with a TOF camera includes, as main components, a first projection lens 11A, a first bandpass optical filter 12A, a first display optical element 13A, a first light source 14A, and a projection lens driver 16A that functions as a first focus adjustment unit. The first TOF camera 20A forming the first projector apparatus with a TOF camera includes, as main components, a first imaging lens 21A, a second bandpass optical filter 22A, a first distance image sensor 23A, an analog-to-digital (A/D) converter 24A, an interface circuit 25A, and an imaging lens driver 26A. In addition, the first projector apparatus with a TOF camera includes a timing generator 15A common to the first projector apparatus 10A and the first TOF camera 20A.

The second projector apparatus with a TOF camera has the same configuration as the first projector apparatus with a TOF camera. The second projector apparatus 10B forming the second projector apparatus with a TOF camera includes, as main components, a second projection lens 11B, a third bandpass optical filter 12B, a second display optical element I 3B, a second light source I 4B, and a projection lens driver 16B that functions as a second focus adjustment unit. The second TOF camera 20B forming the second projector apparatus with a TOF camera includes, as main components, a second imaging lens 21 B, a fourth bandpass optical filter 22B, a second distance image sensor 23B, an A/D converter 24B, an interface circuit 25B, and an imaging lens driver 26B. In addition, the second projector apparatus with a TOF camera includes a timing generator 15B common to the second projector apparatus 10B and the second TOF camera 20B.

The projector apparatus 1 with a distance image acquisition device further includes a central processing unit (CPU) 30, a memory 32, and a distance measurement mode selection unit 34 which are common to the first projector apparatus with a TOF camera and the second projector apparatus with a TOF camera.

<First Projector Apparatus 10A>

The first projector apparatus 10A according to this embodiment is a single-panel projector apparatus including one display optical element. The first light source 14A of the first projector apparatus 10A is, for example, a light emitting diode that emits white light as projection light and can emit pulsed light in response to a timing signal applied from the timing generator 15A. In addition, an RGB dichroic mirror (not illustrated) that separates the white light emitted from the first light source 14A into red (R), green (G), and blue (B) colors is provided between the first light source 14A and the first display optical element 13A. The RGB dichroic mirror separates the white light into R, G, and B light components such that the R, G, and B light components are incident on the first display optical element 13A at different angles.

The first display optical element 13A is, for example, a transmissive liquid crystal display element and includes microlenses each of which is provided for three pixels. In a case in which R, G, and B light components are incident on one microlens at different angles, the R, G, and B light components are incident on any of three pixels.

In the first display optical element 13A, the transmittance of each pixel is controlled according to the image for a far distance (first projection image) to be projected. Therefore, a first RGB projection image is emitted from the first display optical element 13A. The driving timing of the first display optical element 13A is controlled by a timing signal for each frame which is applied from the timing generator 15A.

The wavelength range of the first RGB projection image emitted from the first display optical element 13A is selected by the first bandpass optical filter 12A. Then, the first RGB projection image is projected to the far projection object (first projection object) through the first projection lens 11A. The projection lens driver 16A controls the position of the first projection lens 11A such that the projection image for a far distance is focused on the surface of the far projection object in response to a focus adjustment command from the CPU 30.

Figure 3:
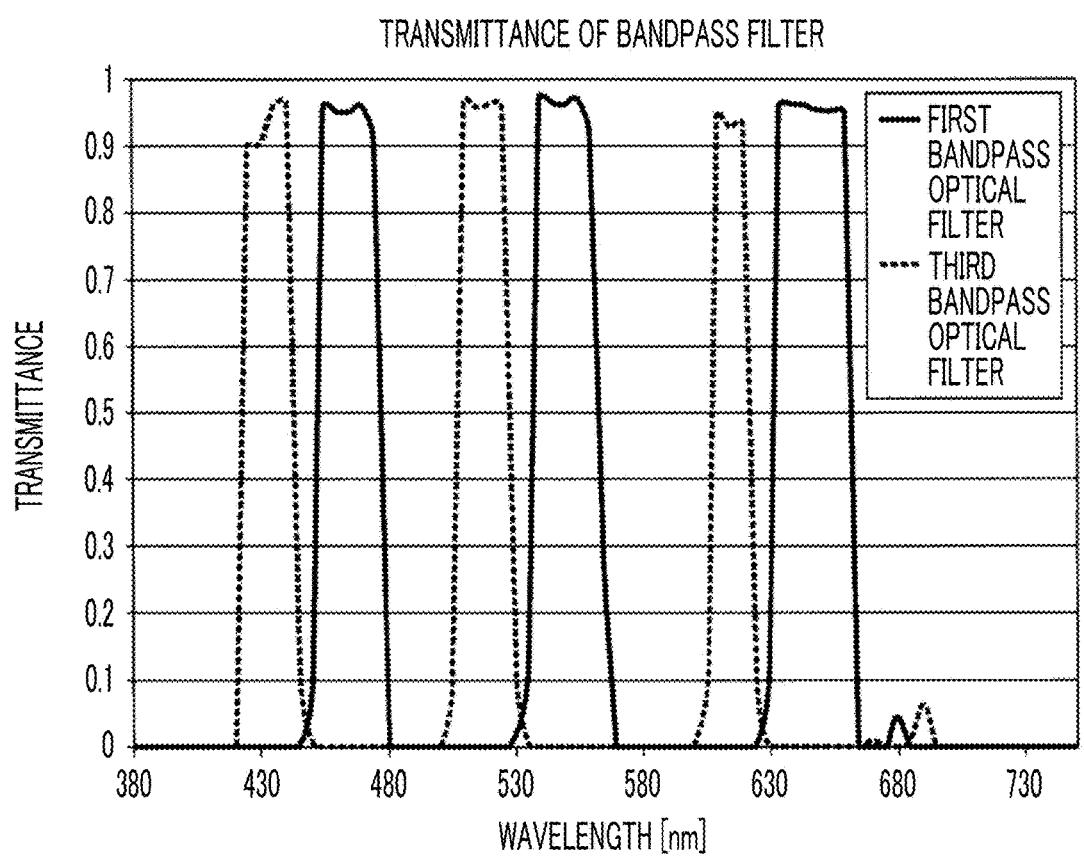
FIG. 3 is a graph illustrating the transmittance of each of a first bandpass optical filter and a third bandpass optical filter.

FIG. 3 is a graph illustrating the transmittance of each of the first bandpass optical filter 12A and the third bandpass optical filter 12B.

As illustrated in FIG. 3, each of the first bandpass optical filter 12A and the third bandpass optical filter 12B has a transmission wavelength ranges for three primary colors, that is, blue with a wavelength that is equal to or less than 480 nm, green with a wavelength that is equal to or greater than 500 nm and equal to or less than 580 nm, and red with a wavelength that is equal to or greater than 590 nm. The RGB transmission wavelength ranges of the first bandpass optical filter 12A and the third bandpass optical filter 12B are designed so as not to overlap each other.

As described above, the first projector apparatus 10A projects the projection image for a far distance to the far projection object.

<First TOF Camera 20A>

The first TOF camera 20A measures the time until light is emitted to an object and reflected light is received by a sensor and calculates the distance (three-dimensional distance image) to the object. In a case in which the first projector apparatus 10A projects the projection image for a far distance and the far projection object is irradiated with the projection image emitted as pulsed light, the first TOF camera 20A according to this embodiment receives light reflected from the far projection object using the first distance image sensor 23A including a plurality of pixels and acquires a distance image of the far projection object from the amount of light (the intensity of light) received by each pixel of the first distance image sensor 23A.

The first imaging lens 21A of the first TOF camera 20A focuses the light reflected from the far projection object (the reflected light of the projection image for a far distance emitted as pulsed light from the first projector apparatus 10A) on the first distance image sensor 23A through the second bandpass optical filter 22A. The imaging lens driver 26A controls the position of the first imaging lens 21A such that a projection image for a far distance which has been reflected from the surface of the far projection object is focused on a light receiving surface of the first distance image sensor 23A in response to a focus adjustment command from the CPU 30.

The second bandpass optical filter 22A has the same characteristics as the first bandpass optical filter 12A illustrated in FIG. 3. The bandpass optical filters having the same characteristics are not limited to the same bandpass optical filters. The second bandpass optical filter 22A for receiving light may have a wider transmission wavelength range than the first bandpass optical filter 12A for projection. That is, the transmission wavelength range of the second bandpass optical filter 22A for receiving light may not overlap the wavelength range of the projection image for a near distance emitted as pulsed light from the second projector apparatus 10B.

The first distance image sensor 23A includes a complementary metal-oxide semiconductor (CMOS) driver having, for example, a vertical driver and a horizontal driver and a CMOS image sensor that is driven by the timing generator. However, the first distance image sensor 23A is not limited to the CMOS type and may be an XY-address-type image sensor or a charge coupled device (CCD) image sensor.

In the first distance image sensor 23A, a plurality of light-receiving elements (photodiodes) are two-dimensionally arranged and RGB color filters are provided on the incident surface side of each of the plurality of light-receiving elements. In this way, RGB pixels are formed. In general, a Bayer array is used as the array of the RGB color filters. However, the array is not limited to the Bayer array.

Figure 4:
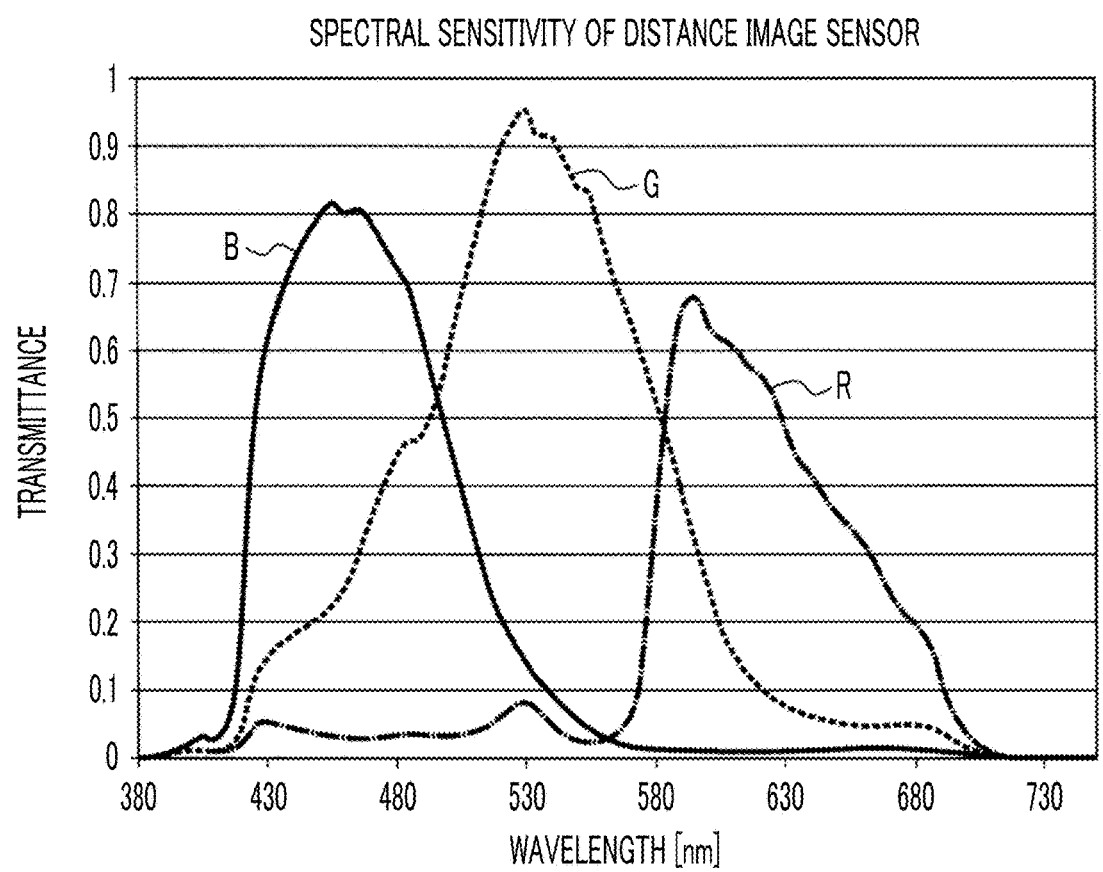
FIG. 4 is a graph illustrating the spectral sensitivity of a distance image sensor.

FIG. 4 is a graph illustrating the spectral sensitivity of the distance image sensor and mainly corresponds to the transmittance of the RGB color filters.

Figure 5:
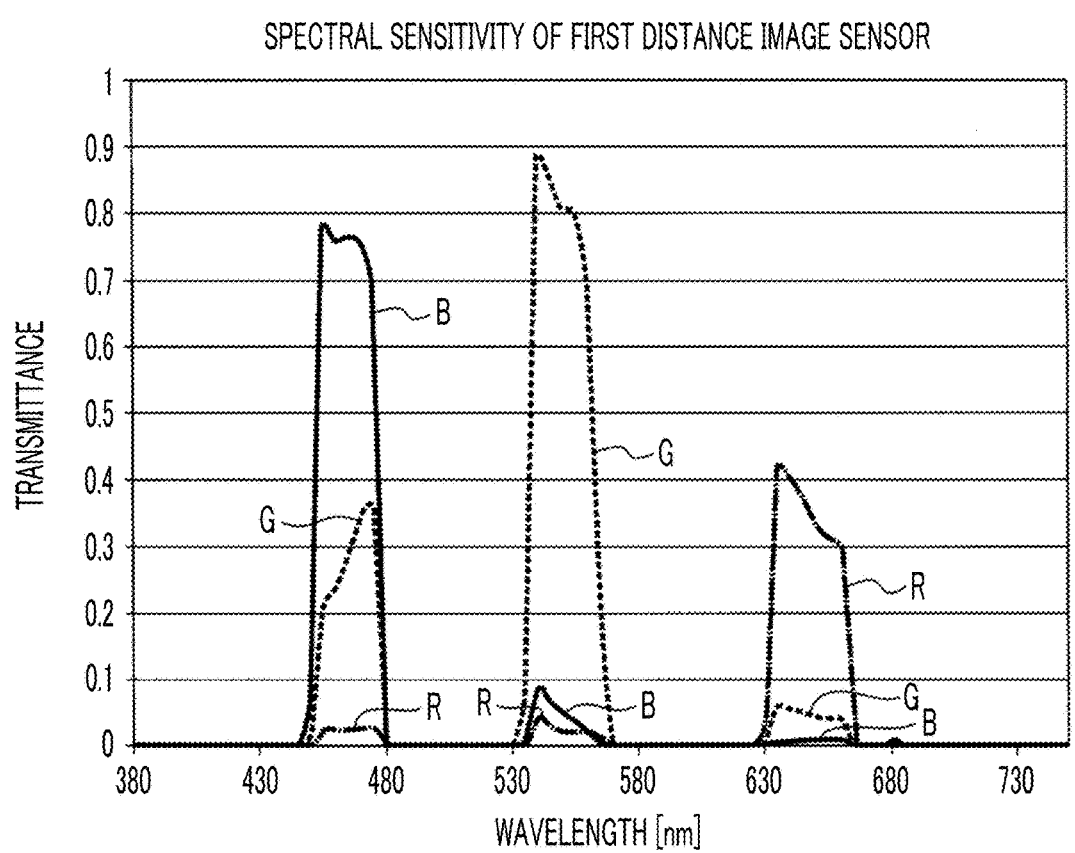
FIG. 5 is a graph illustrating the spectral sensitivity of a first distance image sensor.

The second bandpass optical filter 22A has the same characteristics as the first bandpass optical filter 12A and the distance image sensor (first distance image sensor 23A) has the spectral sensitivity illustrated in FIG. 4. Therefore, light in the wavelength range illustrated in FIG. 5 is incident on the RGB pixels of the first distance image sensor 23A.

The exposure period (the exposure time and the exposure timing) of the first distance image sensor 23A is controlled by a shutter control signal which is applied from the timing generator 15A in synchronization with the emission of pulsed light from the first light source 14A and charge corresponding to the amount of light incident for the exposure period is accumulated in each light-receiving element of the first distance image sensor 23A. Then, a pixel signal corresponding to the amount of incident light (an analog signal corresponding to the charge accumulated in each pixel) is read out from the first distance image sensor 23A.

Here, the timing generator 15A sequentially performs first exposure control in which pulsed light is emitted from the first light source 14A and the amount of exposure (the time when pulsed light is received) of the corresponding light-receiving element in the first distance image sensor 23A varies depending on at least the distance to the far projection object and second exposure control in which pulsed light is emitted from the first light source 14A, the phase of the start of exposure to pulsed light is different from the phase of the start of exposure to pulsed light in the first exposure control, and all of the light-receiving elements of the first distance image sensor 23A are exposed to pulsed light (the first projection image for a far distance) reflected from the far projection object, which will be described in detail below.

The analog signal read out from the first distance image sensor 23A after the exposure control is performed by the timing generator 15A is converted into a digital signal by the A/D converter 24A and is stored in the memory 32 through the interface circuit 25A that functions as an image input controller.

The memory 32 stores various types of data required for processes in the CPU 30 and functions as a working memory of the CPU 30. In addition, the memory 32 stores a motion picture or a still image for projection and can function as a recording unit that stores images captured by the first TOF camera 20A and the second TOF camera 20B.

The CPU 30 has the function of a device control unit that controls the overall operation of each unit, such as the timing generator 15A, the projection lens driver 16A, and the imaging lens driver 26A, and the functions of a distance image generation unit 30A (a first distance image generation unit and a second distance image generation unit), a projection image generation unit 30B (a first projection image generation unit and a second projection image generation unit), and a control unit 30C, which will be described in detail below.

The distance image generation unit 30A generates the three-dimensional distance images of the far projection object and the near projection object on the basis of the outputs from the distance image sensors (the first distance image sensor 23A and the second distance image sensor 23B).

The projection image generation unit 30B generates a projection image for a far distance and a projection image for a near distance on the basis of a first distance image and a second distance image generated by the distance image generation unit 30A.

The distance measurement mode selection unit 34 is a selection unit that is manually operated to select a static distance measurement mode or a dynamic distance measurement mode. Here, the static distance measurement mode is a distance measurement mode that is selected in a case in which a projection object is at a standstill. The dynamic distance measurement mode is a distance measurement mode that is selected in a case in which a projection object is a moving body.

Since the second projector apparatus 10B and the second TOF camera 20B have the same configurations as the first projector apparatus 10A and the first TOF camera 20A, the detailed description thereof will not be repeated. However, the second projector apparatus 10B and the second TOF camera 20B mainly differ from the first projector apparatus 10A and the first TOF camera 20A in that the characteristics of the third bandpass optical filter 12B and the fourth bandpass optical filter 22B are different from the characteristics of the first bandpass optical filter 12A and the second bandpass optical filter 22A and the second projector apparatus 10B projects the projection image for a near distance (second projection image).

The third bandpass optical filter 12B has the transmittance represented by a dashed line in FIG. 3. The fourth bandpass optical filter 22B has the same characteristics as the third bandpass optical filter 12B. Here, the bandpass optical filters having the same characteristics are not limited to the bandpass optical filters having the exact same characteristics. The fourth bandpass optical filter 22B for receiving light may have a wider transmission wavelength range than the third bandpass optical filter 12B for projection. That is, the transmission wavelength range of the fourth bandpass optical filter 22B for receiving light may not overlap the wavelength range of the projection image for a far distance emitted as pulsed light from the first projector apparatus 10A. Therefore, the second bandpass optical filter 22A and the fourth bandpass optical filter 22B for receiving light may have a wider transmission wavelength range than the first bandpass optical filter 12A and the third bandpass optical filter 12B for projection.

Figure 6:
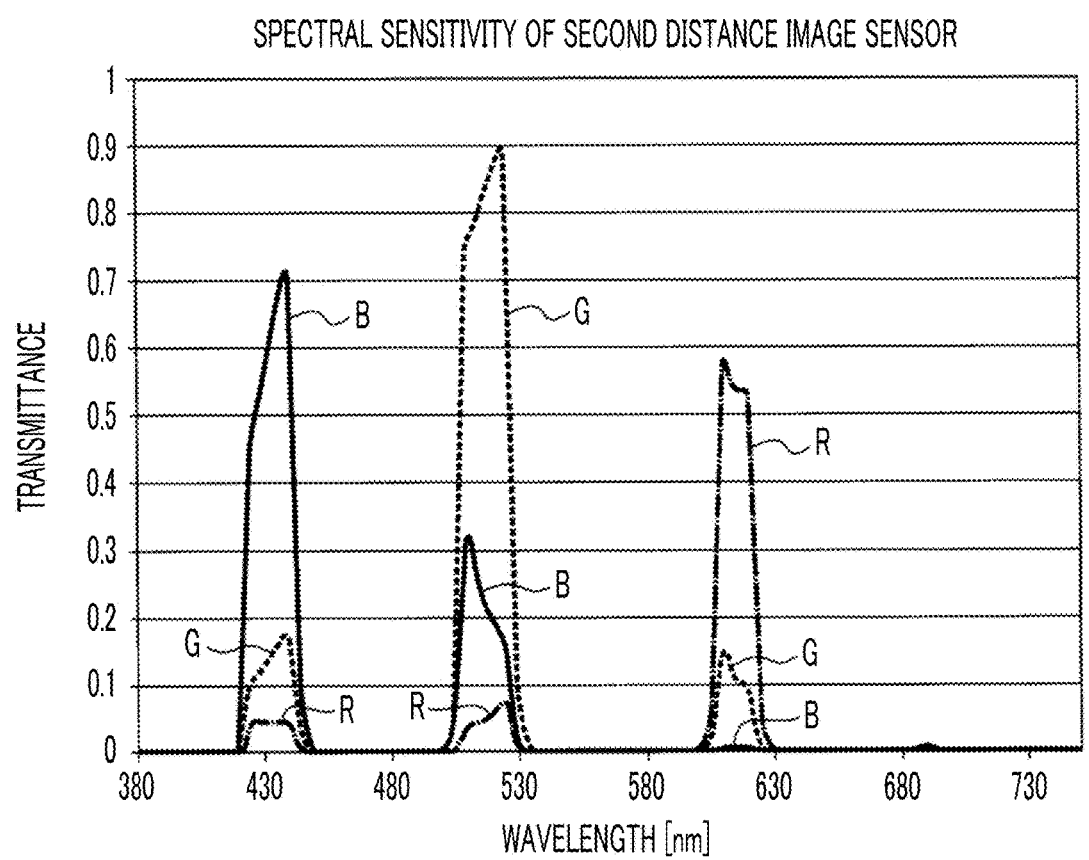
FIG. 6 is a graph illustrating the spectral sensitivity of a second distance image sensor.

Since the fourth bandpass optical filter 22B has the same characteristics as the third bandpass optical filter 12B and the distance image sensor (second distance image sensor 23B) has the spectral sensitivity illustrated in FIG. 4, light in the wavelength range illustrated in FIG. 6 is incident on the RGB pixels of the second distance image sensor 23B.

The first bandpass optical filter 12A illustrated in FIG. 3 (the second bandpass optical filter 22A having the same characteristics as the first bandpass optical filter 12A) has a wider transmission wavelength range than the third bandpass optical filter 12B (the fourth bandpass optical filter 22B having the same characteristics as the third bandpass optical filter 12B). Therefore, the amount of light emitted as the projection image for a far distance is more than the amount of light emitted as the projection image for a near distance.

As illustrated in FIGS. 5 and 6, integral sensitivity obtained by multiplying the RGB transmittance of the first bandpass optical filter 12A by the spectral sensitivity of the RGB pixels in the distance image sensor (first distance image sensor 23A) illustrated in FIG. 4 is higher than integral sensitivity obtained by multiplying the RGB transmittance of the third bandpass optical filter I 2B by the spectral sensitivity of the RGB pixels in the distance image sensor (second distance image sensor 23B). Therefore, the difference between the output of the first distance image sensor 23A used to generate a far-distance image and the output of the second distance image sensor 23B used to generate a near-distance image is not large (the accuracy of measurement is uniformized).

In this example, the ratio of the integral sensitivity of the ROB pixels in the first distance image sensor 23A to the integral sensitivity of the RGB pixels in the second distance image sensor 23B (integral sensitivity ratio) is as follows: R=0.87; G=0.72; and B=0.82.

<Basic Principle of TOF Method>

Next, the basic principle of the acquisition of a three-dimensional distance image by the TOF camera will be described. Hereinafter, a case in which the distance image of the far projection object is acquired by the first TOF camera 20A will be described. The second TOF camera 20B can acquire the distance image of the near projection object using the same method as described below.

The first light source 14A of the first projector apparatus 10A is pulse-driven by the timing generator 15A. As a result, a pulsed projection image for a far distance is projected from the first projector apparatus 10A. The projection image for a far distance is reflected from the surface of the far projection object and a reflected pulsed projection image is formed (received) by the first distance image sensor 23A through the first imaging lens 21A and the second bandpass optical filter 22A of the first TOF camera 20A.

Figure 7:
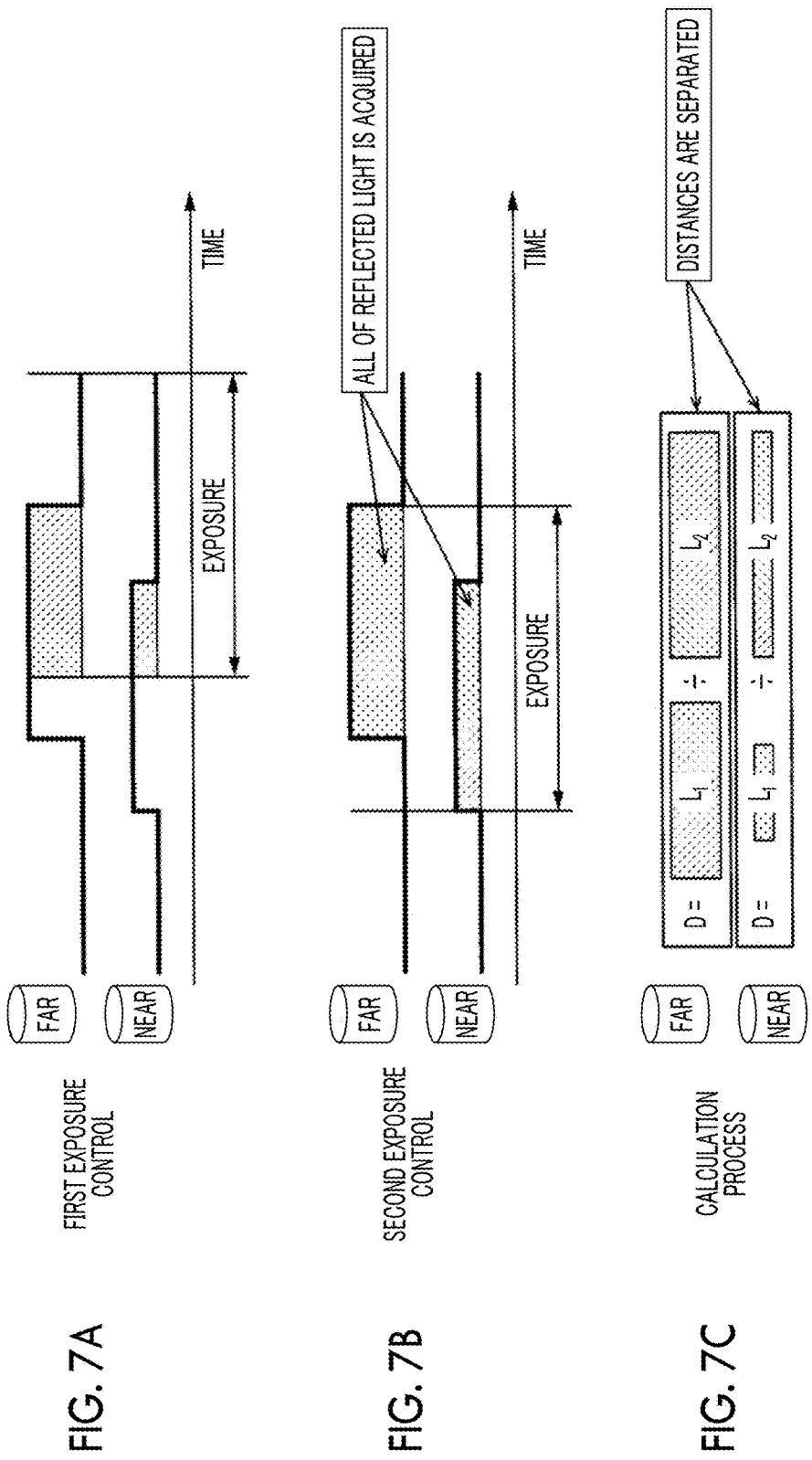
FIGS. 7A to 7C are diagrams illustrating a process of calculating the distances of a far object $T_1$ and a near object $T_2$ in a far projection object.

FIGS. 7A to 7C are diagrams illustrating a process of calculating the distance to a far object $T_1$ and the distance of a near object $T_2$ in the far projection object.

The first light source 14A of the first projector apparatus 10A is pulse-driven by the timing generator 15A. The timing generator 15A sequentially performs two exposure control processes, that is, the first exposure control and the second exposure control for the first distance image sensor 23A in synchronization with the pulse driving of the first light source 14A, as illustrated in FIGS. 7A and 7B.

In the first exposure control illustrated in FIG. 7A, a pulsed projection image is emitted from the first projector apparatus 10A and the exposure period is controlled such that the amount of exposure of the corresponding light-receiving element in the first distance image sensor 23A varies depending on at least the distance to the projection object. After a predetermined period of time (the time until pulsed light (projection image) returns from the far object whose distance can be measured) has elapsed since the pulsed light has been emitted from the first light source 14A, exposure starts. After the time (predetermined exposure time) required for all of pulsed light (projection image) reflected from at least the farthest object to return has elapsed, the exposure ends.

In general, the projection image is continuously projected at a predetermined frame rate (60 frames/second or 30 frames/second). However, the pulsed projection image according to this example is one pulsed image for one frame period (in a case in which the frame rate 60 frames/second, 1/60 (second)) and has a frame period that is sufficiently shorter than one frame period. That is, the frame period of the projection image is so short that, until a pulsed image emitted for a certain frame period is reflected from the farthest object and all of the pulsed image returns, the pulsed image is not emitted for the next frame period.

According to the first exposure control, in a case in which the reflectivity of an object is constant and an image has the uniform amount of light on the entire screen, the amount of exposure of the far object $T_1$ is more than the amount of exposure of the near object $T_2$.

In the second exposure control illustrated in FIG. 7B, pulsed light is emitted from the first light source 14A and the phase of the start of exposure to pulsed light is different from the phase of the start of exposure to pulsed light in the first exposure control. The second exposure control is performed in order to remove a difference in the reflectivity of an object and a change in the amount of exposure in the first distance image sensor 23A by a pulsed projection image having the non-uniform amount of light on the entire screen. In this example, in the second exposure control, all of the light-receiving elements of the first distance image sensor 23A are exposed to all of the pulsed light (pulsed projection image) reflected from an object. Specifically, exposure starts in synchronization with the emission time of pulsed light from the first light source 14A. The exposure ends after a predetermined period of time (a predetermined exposure time until all of the pulsed projection image returns from at least the farthest object whose distance can be measured) has elapsed. The "predetermined exposure time" in the first exposure control and the "predetermined exposure time" in the second exposure control are equal to each other. However, the phase of the start of exposure to pulsed light in the first exposure control is different from the phase of the start of exposure to pulsed light in the second exposure control.

Then, in a case in which sensor outputs (output data of a certain pixel) corresponding to each amount of exposure acquired from the first distance image sensor 23A by the first exposure control and the second exposure control are first data $L_1$ and second data $L_2$ as illustrated in FIG. 7C, the distance image generation unit 30A of the CPU 30 calculates distance information D corresponding to the distance of the object using the following expression:

$$D=L_1 \div L_2. \quad \text{[Expression 1]}$$

That is, division data obtained by dividing the first data $L_1$ by the second data $L_2$ is calculated by [Expression 1]. The division data is data (distance information D) corresponding to a relative distance from which the influence of the reflectivity of the object and the influence of the amount of light of the pulsed projection image having the uniform amount of light on the entire screen have been removed. The distance information D is information corresponding to the time (time of flight) until light is emitted to the projection object and reflected light is received by the distance image sensor. However, the absolute distance of the object may be calculated on the basis of the first data $L_1$ and the second data $L_2$.

Then, the distance information D of all of the pixels of the first distance image sensor 23A is acquired to generate a three-dimensional distance image.

Sensor outputs for each of R, G, and B are obtained from the first distance image sensor 23A. It is preferable that the distance image generation unit 30A generates brightness data from the sensor outputs for each of R, G, and B and uses the generated brightness data as the first data $L_1$ and the second data $L_2$. In addition, instead of the brightness data, the sensor output for G that most contributes to generating the brightness data may be used as the first data $L_1$ and the second data $L_2$.

Next, the focus range of the projection image for a far distance and the projection image for a near distance projected from the first projector apparatus 10A and the second projector apparatus 10B will be described.

The first projector apparatus 10A and the second projector apparatus 10B are configured such that the projection lens drivers 16A and 16B can control the position of the first projection lens 11A and the second projection lens 11B in response to focus adjustment commands from the CPU 30.

Since the distance image generation unit 30A generates the distance image of the far projection object and the distance image of the near projection object, the CPU 30 outputs the focus adjustment command to the projection lens driver 16A on the basis of the distance image (for example, the average value of the distance image) of the far projection object and similarly outputs the focus adjustment command to the projection lens driver 16B on the basis of the distance image of the near projection object. The position of the first projection lens 11A in the first projector apparatus 10A and the position of the second projection lens 11B in the second projector apparatus 10B are adjusted and the focus range (first focus range) of the first projection lens 11A and the focus range (second focus range) of the second projection lens 11B are controlled.

FIGS. 8(A) and 8(B) are diagrams illustrating the focus ranges (the depth of field of the first projector apparatus 10A and the depth of field of the second projector apparatus 10B) of the projection image for a far distance and the projection image for a near distance projected from the first projector apparatus 10A and the second projector apparatus 10B, respectively.

In the projector apparatus 1 with a distance image acquisition device illustrated in FIGS. 8(A) and 8(B), the first projection lens 11A and the second projection lens 11B are adjusted to different positions. The depth of field of the first projector apparatus 10A and the depth of field of the second projector apparatus 10B in the projector apparatus 1 with a distance image acquisition device illustrated in FIG. 8(A) are shifted closer to the near distance side than those in the projector apparatus 1 with a distance image acquisition device illustrated in FIG. 8(B).

Figure 8:
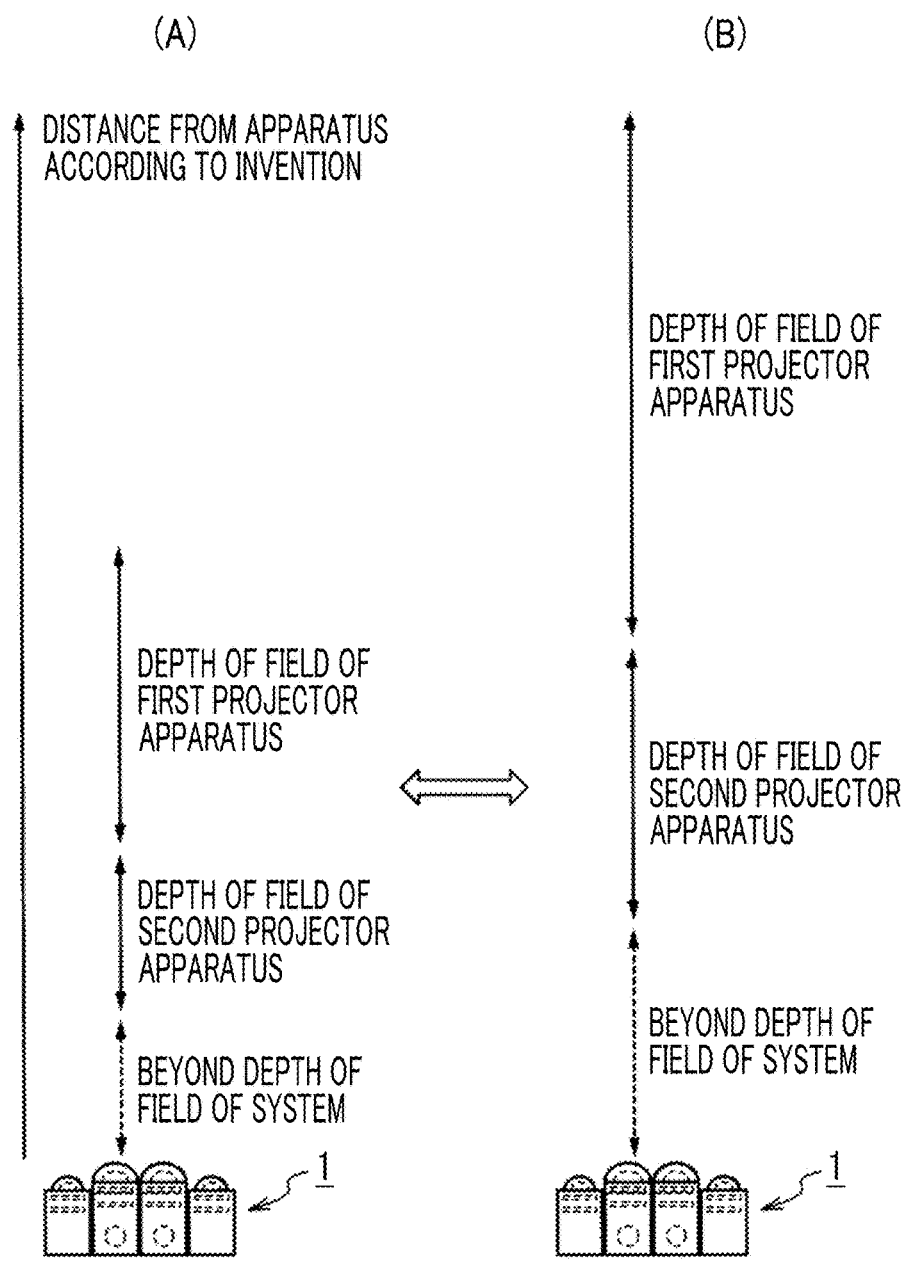
FIG. 8 is a diagram illustrating the focus ranges of a projection image for a far distance and a projection image for a near distance which are projected from a first projector apparatus and a second projector apparatus, respectively.

It is preferable that the depth of field of the first projector apparatus 10A and the depth of field of the second projector apparatus 10B (the first focus range and the second focus range) are continuous or partially overlap each other as illustrated in FIG. 8. In addition, the depth of fields may be adjusted by a lens stop (not illustrated) such that the first focus range and the second focus range are continuous or overlap each other.

In a case in which there is a gap between a far distance and a near distance and there is no projection object at an intermediate distance, which is not clearly described, it is not necessary to perform projection. Therefore, the gap portion may not fall within the depth of field. That is, the depth of field of the first projector apparatus 10A and the depth of field of the second projector apparatus 10B are not necessarily continuous and there may be a gap between the depths of field.

[Projection Image Generation Unit 30B]

Next, the projection image generation unit 30B of the CPU 30 will be described in detail.

<First Generation Example of Projection Image>

Figure 9:
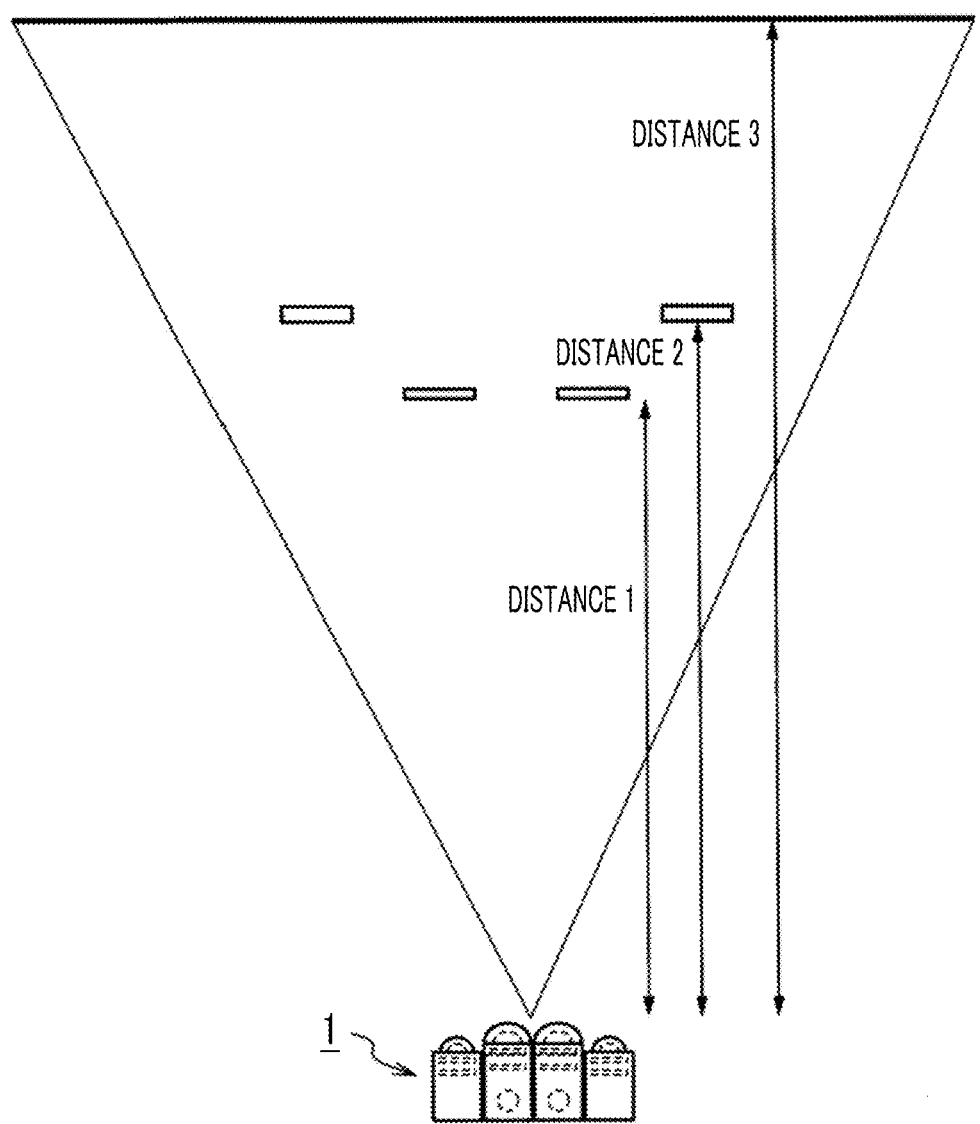
FIG. 9 is a diagram illustrating a case in which the projector apparatus with a distance image acquisition device projects a projection image to projection objects at different distances, that is, distance 1, distance 2, and distance 3.

FIG. 9 illustrates a case in which the projector apparatus 1 with a distance image acquisition device projects a projection image to projection objects at different distances, that is, distance 1, distance 2, and distance 3.

In this example, the projection objects at distance 1 and distance 2 are near projection objects and the projection object at distance 3 is a far projection object.

Figure 10:
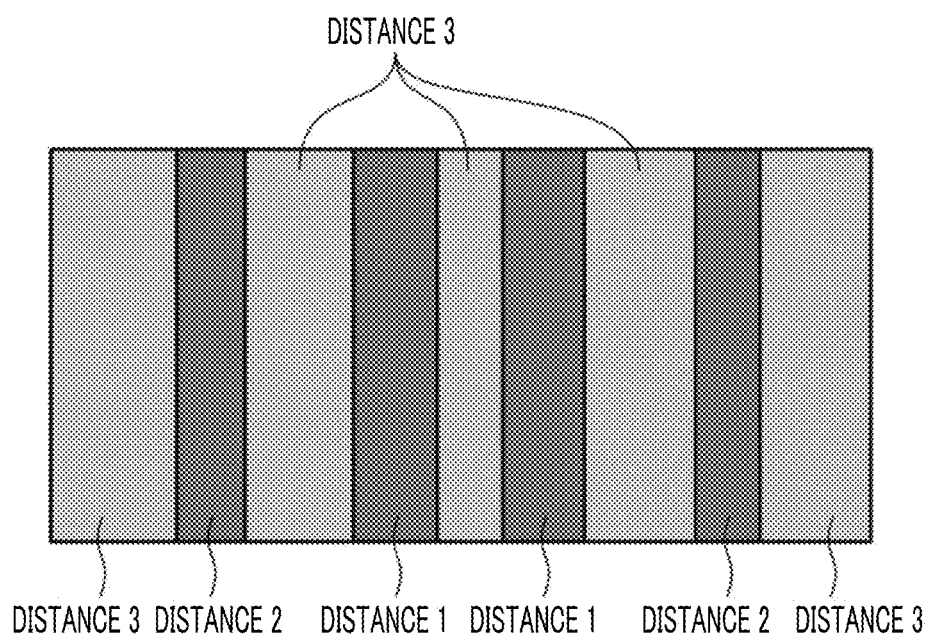
FIG. 10 is a diagram schematically illustrating an example of the projection image projected to the surfaces of the projection objects illustrated in FIG. 9.

FIG. 10 is a diagram schematically illustrating an example of the projection image projected to the surfaces of the projection objects illustrated in FIG. 9.

The projection image generation unit 30B of the CPU 30 performs, for example, a trimming process, a coordinate transformation process, and an enlargement and reduction process for the image for projection (a motion picture or a still image) recorded in the memory 32, using the first distance image and the second distance image (that is, information, such as the shape, size, and irregularity of the near projection object and the far projection object) generated by the distance image generation unit 30A, to generate a projection image for a far distance and a projection image for a near distance corresponding to the far projection object and the near projection object.

Figure 11A:
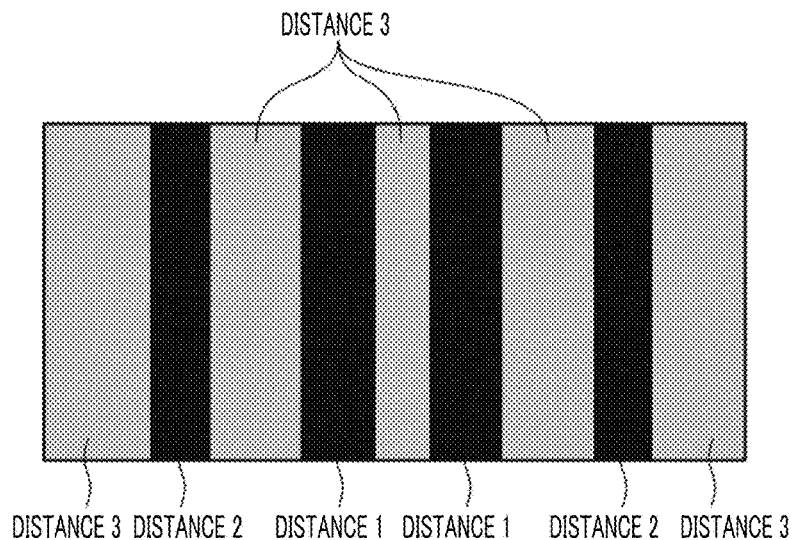
FIGS. 11A and 11B are diagrams schematically illustrating a projection image for a far distance and a projection image for a near distance projected to the projection objects illustrated in FIG. 9.
Figure 11B:
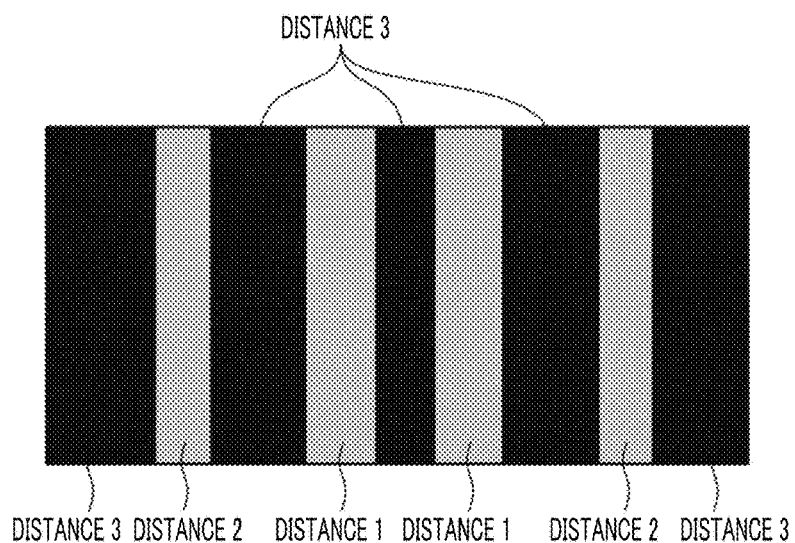

FIGS. 11A and 11B are diagrams schematically illustrating the projection image for a far distance and the projection image for a near distance, respectively, and illustrates the projection image for a far distance and the projection image for a near distance for displaying the projection image illustrated in FIG. 10 on the projection objects at distance 1, distance 2, and distance 3 illustrated in FIG. 9.

The projection image for a far distance illustrated in FIG. 11A is a projection image that is projected to only the projection object at distance 3 (far projection object) in the projection field of view. In the projection image for a far distance, portions corresponding to the projection objects at distance 1 and distance 2 (near projection objects) are black images.

The projection image for a near distance illustrated in FIG. 11B is a projection image that is projected to only the projection objects at distance 1 and distance 2 (near projection objects) in the projection field of view. In the projection image for a near distance, a portion corresponding to the projection object at distance 3 (far projection object) is a black image.

The projection image generation unit 30B processes the projection image illustrated in FIG. 10 on the basis of the first distance image and the second distance image generated by the distance image generation unit 30A to generate the projection image for a far distance and the projection image for a near distance illustrated in FIGS. 11A and 11B.

In the first display optical element 13A of the first projector apparatus 10A illustrated in FIG. 2, the transmittance of each optical element is controlled on the basis of the projection image for a far distance generated by the projection image generation unit 30B. In the second display optical element 13B of the second projector apparatus 10B, the transmittance of each optical element is controlled on the basis of the projection image for a near distance generated by the projection image generation unit 30B.

<Second Generation Example of Projection Image>

Figure 12:
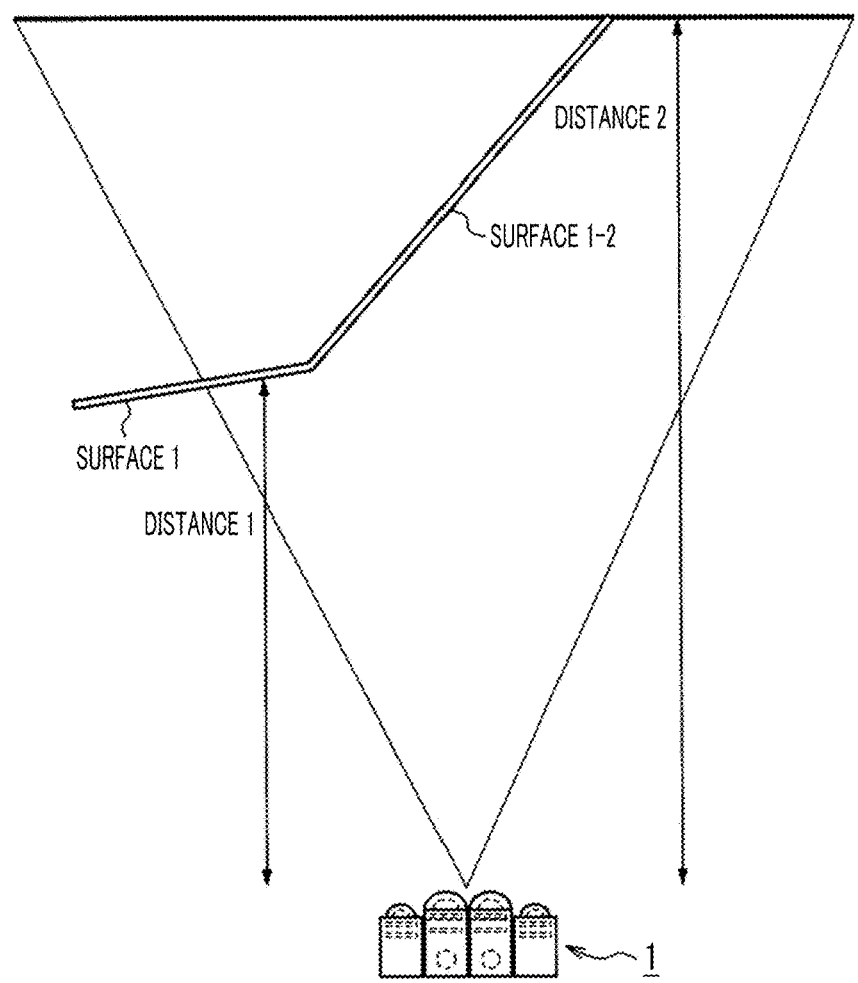
FIG. 12 is a diagram illustrating a case in which the projector apparatus with a distance image acquisition device projects a projection image to a projection object (surface 1) at distance 1, a projection object at distance 2, and an oblique projection object (surface 1-2) whose distance changes continuously between distance I and distance 2.

FIG. 12 illustrates a case in which the projector apparatus I with a distance image acquisition device projects a projection image to a projection object (surface 1) at distance 1, a projection object at distance 2, and an oblique projection object (surface 1-2) whose distance is continuously changed between distance 1 and distance 2.

In this example, a projection object that is in front of the intermediate position of the oblique projection object (surface 1-2) (close to the projector apparatus 1 with a distance image acquisition device) is a near projection object and a projection object that is behind the intermediate position is a far projection object.

Figure 13:
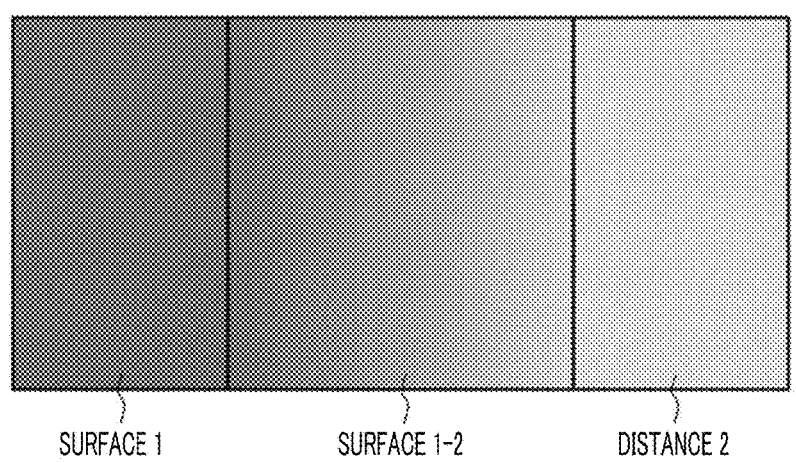
FIG. 13 is a diagram schematically illustrating an example of the projection image projected to the surfaces of the projection objects illustrated in FIG. 12.

FIG. 13 is a diagram schematically illustrating an example of the projection image that is projected to the surfaces of the projection objects illustrated in FIG. 12.

Figure 14A:
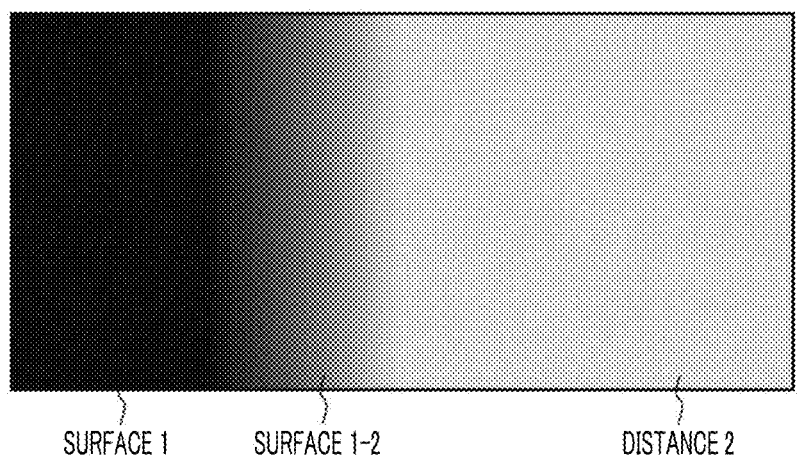
FIGS. 14A and 14B are diagrams schematically illustrating a projection image for a far distance and a projection image for a near distance projected to the projection objects illustrated in FIG. 12.
Figure 14B:
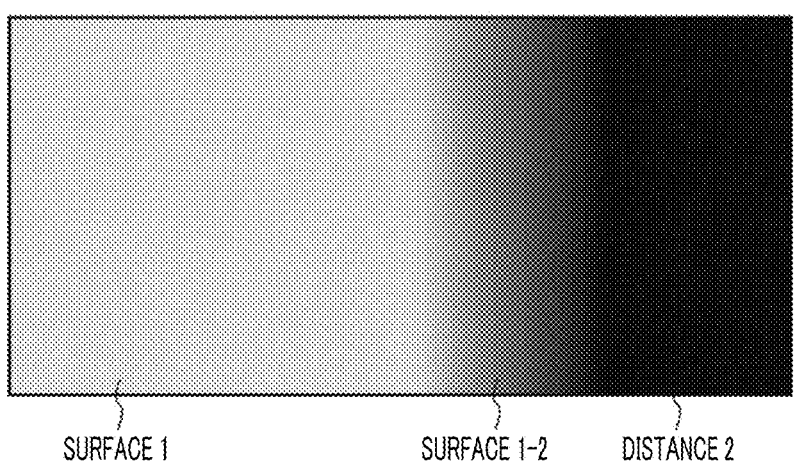

FIGS. 14A and 14B are diagrams schematically illustrating the projection image for a far distance and the projection image for a near distance, respectively, and illustrates the projection image for a far distance and the projection image for a near distance for displaying the projection image illustrated in FIG. 13 on surface 1, surface 1-2, and the projection object at distance 2 illustrated in FIG. 12.

The projection image for a far distance illustrated in FIG. 14A is a projection image that is projected to only about the rear half of surface 1-2 and the projection object at distance 2 (far projection object) in the projection field of view. In the projection image for a far distance, portions corresponding to surface 1 and about the front half (near projection object) of surface 1-2 are black images.

The projection image for a near distance illustrated in FIG. 14B is a projection image that is projected to only the projection object at distance 1 and about the front half (near projection object) of surface 1-2 in the projection field of view. In the projection image for a near distance, portions corresponding to about the rear half of surface 1-2 and the projection object at distance 2 (far projection object) are black images.

However, surface 1-2 is the surface of the oblique projection object whose distance is continuously changed between distance 1 and distance 2. A portion behind the intermediate position in surface 1-2 belongs to the far projection object and a portion in front of the intermediate position in surface 1-2 belongs to the near projection object. Therefore, preferably, as illustrated in FIGS. 14A and 14B, the boundary portion between the projection image for a far distance and the projection image for a near distance is generated such that the projection image for a far distance and the projection image for a near distance are smoothly connected and the images overlap each other. In addition, preferably, the images are adjusted (the images are continuously changed) such that the brightness of an image of the overlap portion is not high.

That is, the brightness of an image corresponding to the boundary portion of the projection image for a far distance is continuously reduced such that the image becomes a black image and the brightness of an image corresponding to the boundary portion of the projection image for a near distance is continuously reduced such that the image becomes a black image.

The projection image generation unit 30B processes the projection image illustrated in FIG. 13 on the basis of the first distance image and the second distance image generated by the distance image generation unit 30A to generate the projection image for a far distance and projection image for a near distance illustrated in FIGS. 14A and 14B.

<Third Generation Example of Projection Image>

Figure 15:
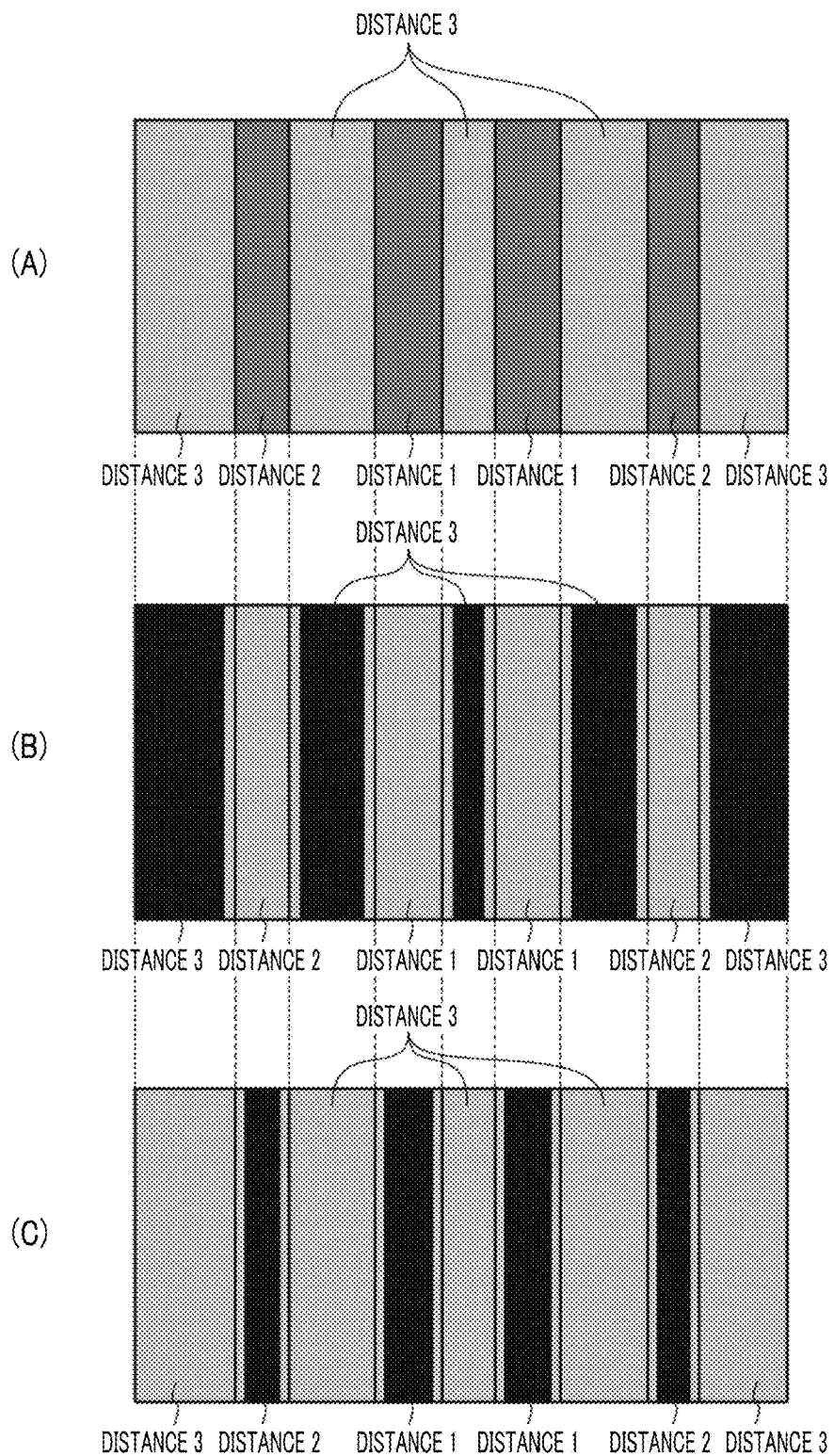
FIG. 15 is a diagram schematically illustrating an example of the projection image projected to the surfaces of the projection objects illustrated in FIG. 9 and a diagram schematically illustrating a projection image for a far distance and a projection image for a near distance.

FIG. 15(A) is a diagram schematically illustrating an example of the projection image projected to the surfaces of the projection objects illustrated in FIG. 9 and illustrates the same projection image as the projection image illustrated in FIG. 10.

FIGS. 15(B) and 15(C) are diagrams schematically illustrating the projection image for a far distance and the projection image for a near distance, respectively, and illustrate the projection image for a far distance and the projection image for a near distance for displaying the projection image illustrated in FIG. 15(A) on the projection objects at distance 1, distance 2, and distance 3 illustrated in FIG. 9.

As can be seen from the comparison between the projection image for a far distance and the projection image for a near distance illustrated in FIGS. 15(B) and 15(C) and the projection image for a far distance and the projection image for a near distance illustrated in FIGS. 11A and 11B, the projection image for a far distance and the projection image for a near distance illustrated in FIGS. 15(B) and 15(C) are generated such that the boundary portions of the projection image for a far distance and the projection image for a near distance overlap each other. However, the projection image for a far distance and the projection image for a near distance are adjusted such that the brightness of the image of the overlap portion is not high (is reduced by halt).

As described above, the projection image for a far distance and the projection image for a near distance are generated such that the boundary portions of the projection image for a far distance and the projection image for a near distance overlap each other. Therefore, even in a case in which the projection object moves, it is possible to measure the distance to the boundary portion in which the projection image for a far distance and the projection image for a near distance overlap each other.

<Stereo Distance Measurement>

Figure 16:
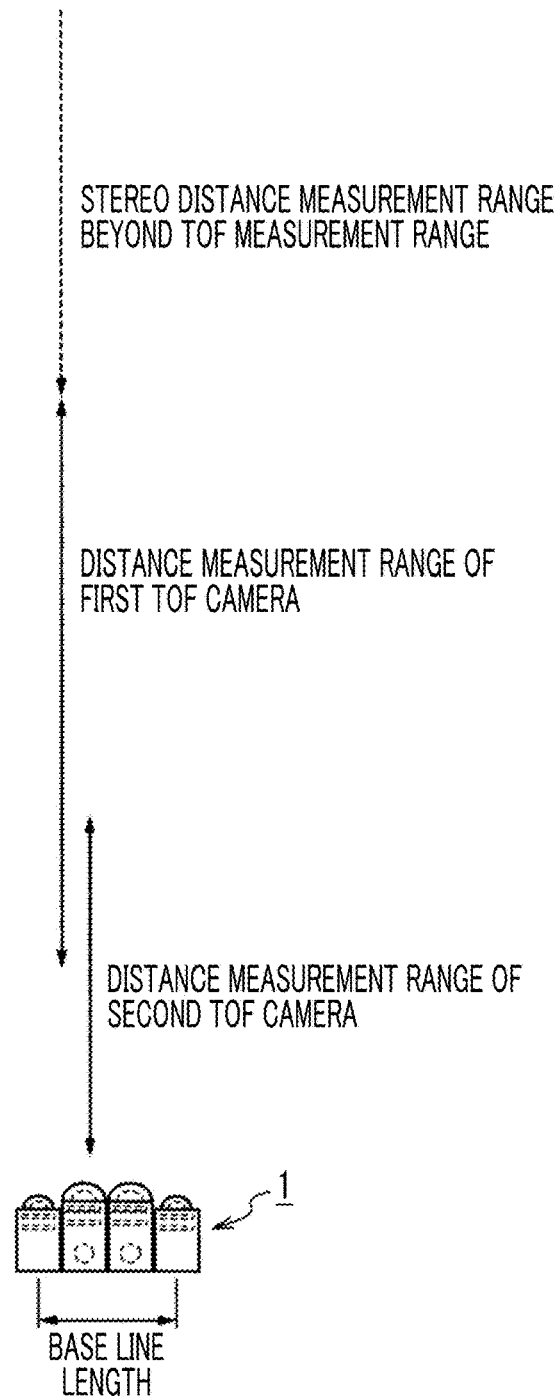
FIG. 16 is a diagram illustrating a distance measurement range and a stereo distance measurement range by a TOF method.

FIG. 16 is a diagram illustrating a distance measurement range and a stereo distance measurement range by the TOF method.

In the TOF method by the first TOF camera 20A and the second TOF camera 20B, in this example, in a case in which the projection object is so far away that the distance is not capable of being accurately measured, the distance is measured by a stereo distance measurement method (triangulation method).

As illustrated in FIG. 16, the projector apparatus I with a distance image acquisition device(two projector apparatuses with a distance image acquisition device, that is, the first projector apparatus with a TOF camera and the second projector apparatus with a TOF camera) is disposed in a direction perpendicular to the projection direction. In particular, the optical axis of the first imaging lens 21A in the first TOF camera 20A and the optical axis of the second imaging lens 21B in the second TOF camera 20B deviate from each other in the direction perpendicular to the projection direction.

The CPU 30 that functions as a triangulation unit measures the distance on the basis of two images (stereo image) acquired from the first TOF camera 20A and the second TOF camera 20B, using a stereo distance measurement method (triangulation method) in which the amount of deviation between the optical axis of the first imaging lens 21A in the first TOF camera 20A and the optical axis of the second imaging lens 21B in the second TOF camera 20B is a base line length.

With this configuration, it is possible to measure the distance, without adding hardware, even in a case in which the projection object is so far away that the distance is not capable of being accurately measured by the TOF method or even in a case in which the projection object is in the far distance beyond the range in which the measurement can be measured by the TOF method according to this example.

<Projection Mapping Method of Distance Measurement Mode>

Next, a projection mapping method according to the invention will be described.

The distance measurement mode selection unit 34 illustrated in FIG. 2 can be manually operated to select any one of a static distance measurement mode and a dynamic distance measurement mode.

Figure 17:
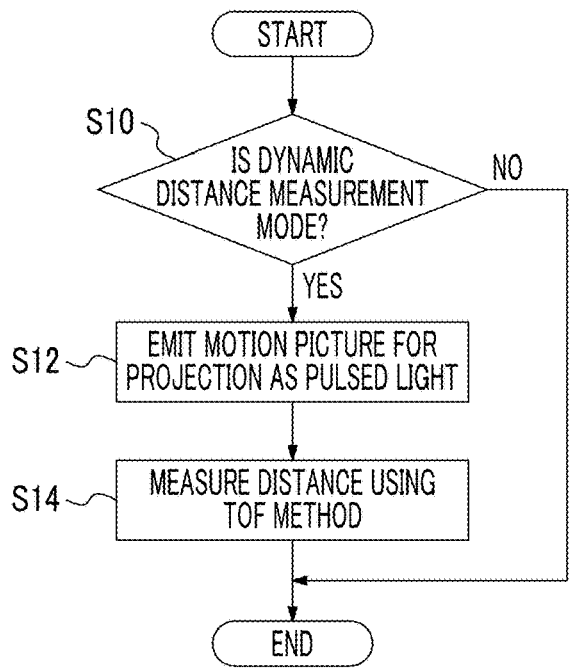
FIG. 17 is a flowchart illustrating a projection mapping method in a case in which a dynamic distance measurement mode is selected.

FIG. 17 is a flowchart illustrating the projection mapping method in a case in which the dynamic distance measurement mode is selected and particularly illustrates a distance image acquisition method in a case in which the projection object is a moving body.

In FIG. 17, the CPU 30 (control unit) determines whether the distance measurement mode selection unit 34 is operated to select the static distance measurement mode or the dynamic distance measurement mode (Step S10).

In a case in which it is determined that the dynamic distance measurement mode is selected (in the case of "Yes"), the CPU 30 pulse-drives the first light source 14A and the second light source 14B through the timing generators 15A and 15B such that the images (an image for a far distance image and an image for a near distance) continuously projected from the first projector apparatus 10A and the second projector apparatus 10B are emitted as pulsed light (Step S12).

The first TOF camera 20A and the second TOF camera 20B focus light reflected from the projection object, which is reflected light with respect to the projection image for a far distance and the projection image for a near distance emitted as pulsed light, on the first distance image sensor 23A and the second distance image sensor 23B through the first imaging lens 21A and the second imaging lens 21B. Then, the first TOF camera 20A and the second TOF camera 20B acquire a distance image of a far projection object and a distance image of a near projection object on the basis of the outputs from the first distance image sensor 23A and the second distance image sensor 23B, using the TOF method (Step S14).

In this example, the distance images are acquired by the first exposure control and the second exposure control (that is, two pulse emission processes) as illustrated in FIGS. 7A to 7C. Therefore, it is possible to acquire the distance images for every two frames of the projection image that is continuously projected.

In a case in which the projection object is moved, the dynamic distance measurement mode is selected and the distance image is continuously acquired (for every two frames of the motion picture).

In a case in which the moving speed of the projection object is low, it is preferable to increase the interval at which the distance image is acquired (the interval at which the first light source 14A and the second light source 14B are pulse-driven) according to the speed of the projection object. In this case, it is possible to increase the amount of light per frame of the image that is continuously projected.

Figure 18:
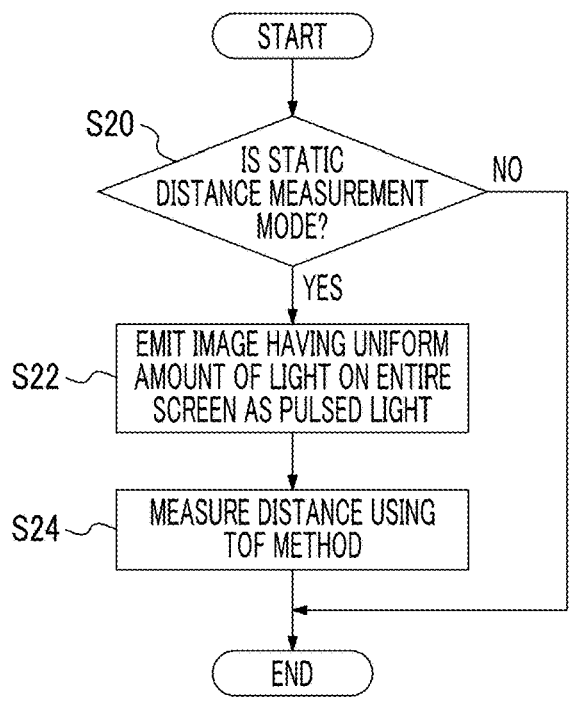
FIG. 18 is a flowchart illustrating a projection mapping method in a case in which a static distance measurement mode is selected.

FIG. 18 is a flowchart illustrating a projection mapping method in a case in which the static distance measurement mode is selected and particularly illustrates a distance image acquisition method in a case in which the projection object is at a standstill.

In FIG. 18, the CPU 30 determines whether the distance measurement mode selection unit 34 is operated to select the static distance measurement mode or the dynamic distance measurement mode (Step S20).

In a case in which the static distance measurement mode is selected (in the case of "Yes"), the CPU 30 pulse-drives the first light source 14A and the second light source 14B through the timing generators 15A and 15B such that images having the uniform amount of light on the entire screen are emitted as pulsed light from the first projector apparatus 10A and the second projector apparatus 10B (Step S22). That is, before the projection of the projection image is projected, the CPU 30 pulse-drives the first light source 14A and the second light source 14B, maximizes the transmittance of each of the first display optical element 13A of the first projector apparatus 10A and the second display optical element 13B of the second projector apparatus 10B, and directs the light sources to emit pulsed light for distance measurement using the TOF method (Step S22).

The first TOF camera 20A and the second TOF camera 20B focus light reflected from the projection object, which is reflected light with respect to the image with the uniform amount of light on the entire screen emitted as pulsed light, on the first distance image sensor 23A and the second distance image sensor 23B through the first imaging lens 21A and the second imaging lens 21B. Then, the first TOF camera 20A and the second TOF camera 20B acquire a distance image of a far projection object and a distance image of a near projection object on the basis of the outputs from the first distance image sensor 23A and the second distance image sensor 23B, using the TOF method (Step S24).

In a case in which the projection object is at a standstill, the static distance measurement mode is selected. Before the projection of the projection image starts, the distance image of the far projection object and the distance image of the near projection object are acquired.

Then, in a case in which the projection object is at a standstill, after the distance image of the far projection object and the distance image of the near projection object are acquired before the projection of the projection image starts, the acquisition of the distance image is not performed. The reason is that, in a case in which the projection object is at a standstill, the distance image does not change. Therefore, in a case in which the projection of the projection image starts, the measurement of the distance by the first TOF camera 20A and the second TOF camera 20B is not performed. Therefore, it is not necessary to pulse-drive the first light source 14A and the second light source 14B.

Since the amount of light that is uniform on the entire screen is emitted as pulsed light to the projection object, it is possible to increase the amount of pulsed light and to accurately measure the distance of the projection object that is at a standstill.

[Others]

Figure 19:
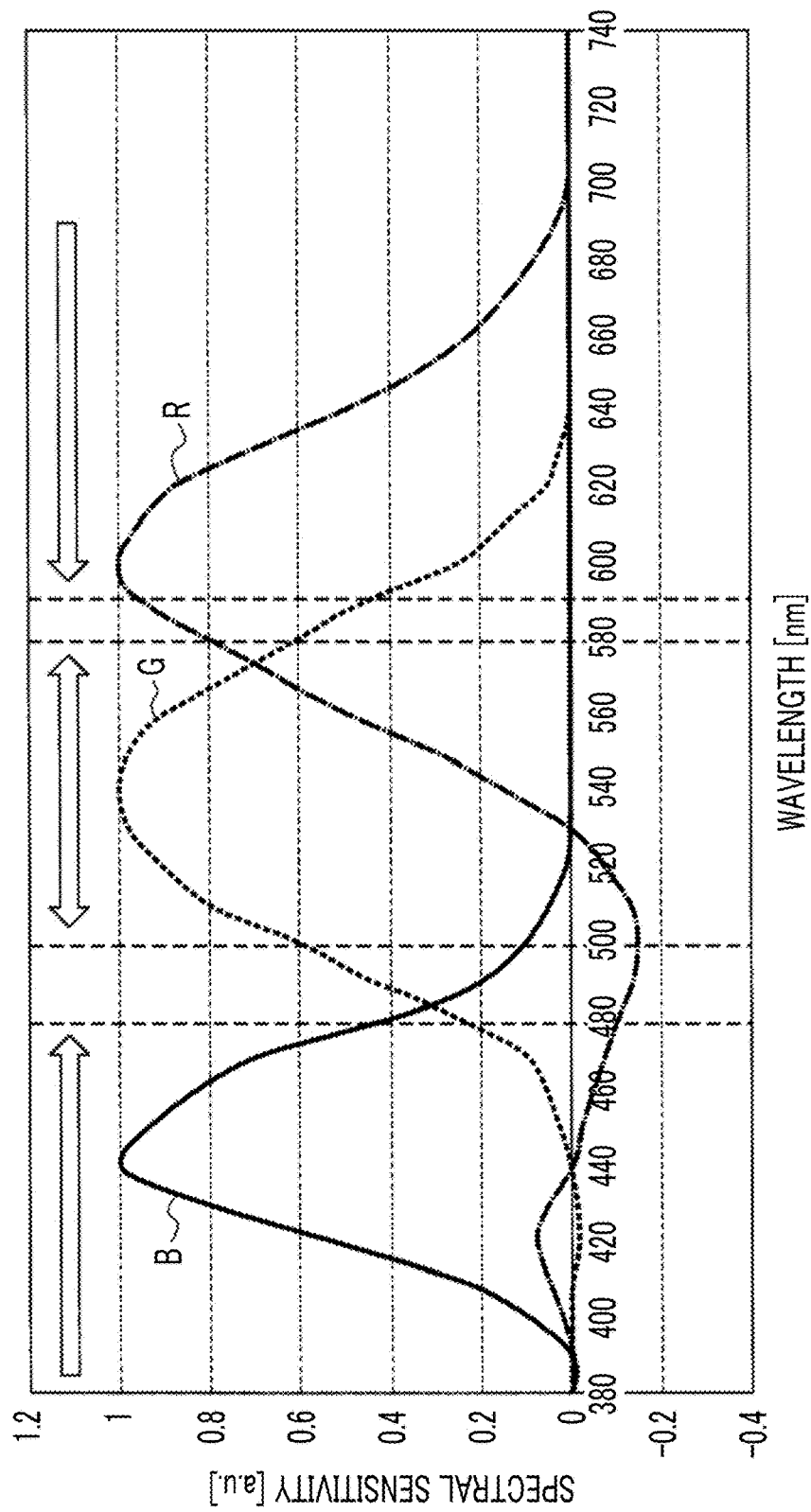
FIG. 19 is a graph illustrating an example of the spectral sensitivity of the human eye for each of R, G, and B.

FIG. 19 is a graph illustrating an example of the spectral sensitivity of the human eye for each of R, G, and B.

In a case in which the first bandpass optical filter 12A and the third bandpass optical filter 12B are designed, it is preferable that the first bandpass optical filter 12A and the third bandpass optical filter 12B are designed according to the spectral sensitivity of the human eye illustrated in FIG. 19. With this configuration, it is possible to project the projection image matched with three primary colors of visible light.

The first display optical element 13A and the second display optical element 13B are not limited to the transmissive liquid crystal display elements. Other display optical elements, such as a reflective liquid crystal display element and a digital micromirror device (DMD), may be applied.

Each of the first projector apparatus 10A and the second projector apparatus 10B according to this embodiment is the single-panel projector apparatus including one display optical element. However, the invention is not limited thereto. Each of the first projector apparatus 10A and the second projector apparatus 10B may be a three-panel projector apparatus including three display optical elements corresponding to three primary colors. In the case of the three-panel projector apparatus, three RGB light emitting diodes can be used as light sources for three display optical elements that display images corresponding to three primary colors (R, G, and B). In addition, instead of the first bandpass optical filter 12A and the third bandpass optical filter 12B (multi-bandpass optical filter), three (R, G, and B) bandpass optical filters corresponding to three display optical elements may be applied.

EXPLANATION OF REFERENCES

1: projector apparatus with distance image acquisition device

10A: first projector apparatus

10B: second projector apparatus
11A: first projection lens
11B: second projection lens
12A: first bandpass optical filter
12B: third bandpass optical filter
13A: first display optical element
13B: second display optical element
14A: first light source
14B: second light source
15A, 15B: timing generator
16A, 16B: projection lens driver
20A: first TOF camera (first distance image acquisition device)
20B: second TOF camera (second distance image acquisition device)
21A: first imaging lens
21B: second imaging lens
22A: second bandpass optical filter
22B: fourth bandpass optical filter
23A: first distance image sensor
23B: second distance image sensor
26A, 26B: imaging lens driver
30: central processing unit (CPU)
30A: distance image generation unit
30B: projection image generation unit
30C: control unit
32: memory
34: distance measurement mode selection unit

What is claimed is:

1. A projector apparatus with a distance image acquisition device, comprising:

a first projector apparatus comprising a first display optical element that displays a first projection image, a first light source that emits projection light to be incident on the first display optical element, a first projection lens that projects a first projection image emitted from the first display optical element to a first projection object, and a first bandpass optical filter that is provided on a projection optical path and has a transmission wavelength range of red, green, and blue;

a first distance image acquisition device comprising a first distance image sensor including a plurality of light-receiving elements which are two-dimensionally arranged, a first imaging lens that forms the first projection image reflected from the first projection object on the first distance image sensor, a second bandpass optical filter that is provided on an imaging optical path and has the same characteristics as the first bandpass optical filter, and a first distance image generation unit that pulse-drives the first light source, acquires first information corresponding to a time of flight of pulsed light, which is emitted from the first light source, is reflected from the first projection object, and is incident on the first distance image sensor, from the first distance image sensor, and generates a first distance image on the basis of the acquired first information;

a second projector apparatus comprising a second display optical element that displays a second projection image, a second light source that emits projection light to be incident on the second display optical element, a second projection lens that projects a second projection image emitted from the second display optical element to a second projection object closer than the first projection object, and a third bandpass optical filter that is provided on a projection optical path and has a transmission wavelength range of red, green, and blue which does not overlap the transmission wavelength range of the first bandpass optical filter; and a second distance image acquisition device comprising a second distance image sensor including a plurality of light-receiving elements which are two-dimensionally arranged, a second imaging lens that forms the second projection image reflected from the second projection object on the second distance image sensor, a fourth bandpass optical filter that is provided on an imaging optical path and has the same characteristics as the third bandpass optical filter, and a second distance image generation unit that pulse-drives the second light source, acquires second information corresponding to a time of flight of pulsed light, which is emitted from the second light source, is reflected from the second projection object, and is incident on the second distance image sensor, from the second distance image sensor, and generates a second distance image on the basis of the acquired second information.

2. The projector apparatus with a distance image acquisition device according to claim 1,
wherein the first bandpass optical filter and the second bandpass optical filter have a wider transmission wavelength range than the third bandpass optical filter and the fourth bandpass optical filter.

3. The projector apparatus with a distance image acquisition device according to claim 2,
wherein integral sensitivity obtained by multiplying transmittance of the first bandpass optical filter by spectral sensitivity of the first distance image sensor is higher than integral sensitivity obtained by multiplying transmittance of the third bandpass optical filter by spectral sensitivity of the second distance image sensor.

4. The projector apparatus with a distance image acquisition device according to claim 1,
wherein a first focus range of the first projection lens is farther than a second focus range of the second projection lens.

5. The projector apparatus with a distance image acquisition device according to claim 4,
wherein the first focus range and the second focus range are continuous or partially overlap each other.

6. The projector apparatus with a distance image acquisition device according to claim 1,
wherein the first projector apparatus further comprises a first focus adjustment unit that adjusts the focus of the first projection lens according to the first distance image acquired by the first distance image acquisition device, and
the second projector apparatus further comprises a second focus adjustment unit that adjusts the focus of the second projection lens according to the second distance image acquired by the second distance image acquisition device.

7. The projector apparatus with a distance image acquisition device according to claim I,
wherein the first projector apparatus further comprises a first projection image generation unit that generates the first projection image which is projected to the first projection object and in which a portion other than a region corresponding to the first projection object is a black image on the basis of the first distance image, and
the second projector apparatus further comprises a second projection image generation unit that generates the second projection image which is projected to the second projection object and in which a portion other than a region corresponding to the second projection object is a black image on the basis of the second distance image.

8. The projector apparatus with a distance image acquisition device according to claim 7,
wherein the first projection image generation unit and the second projection image generation unit generate the first projection image and the second projection image such that a portion of the first projection image other than the black image and a portion of the second projection image other than the black image overlap each other at a boundary portion between the first projection object and the second projection object, respectively, and generates the first projection image and the second projection image such that brightness of the boundary portion in which the first projection image and the second projection image overlap each other is reduced by half, respectively.

9. The projector apparatus with a distance image acquisition device according to claim 1,
wherein the first projector apparatus further comprises a first projection image generation unit that generates the first projection image, in which brightness of an image corresponding to the boundary portion of the first projection image is continuously reduced and the image becomes a black image, on the basis of the first distance image, in a case in which a distance to the boundary portion between the first projection object and the second projection object changes continuously, and
the second projector apparatus further comprises a second projection image generation unit that generates the second projection image, in which brightness of an image corresponding to the boundary portion of the second projection image is continuously reduced and the image becomes a black image, on the basis of the second distance image.

10. The projector apparatus with a distance image acquisition device according to claim I, further comprising:
a triangulation unit that measures a distance longer than a distance that is capable of being acquired by the first distance image acquisition device on the basis of a triangulation method using an output from the first distance image sensor and an output from the second distance image sensor.

11. The projector apparatus with a distance image acquisition device according claim 1, further comprising:
a distance measurement mode selection unit that selects a static distance measurement mode; and
a control unit that directs at least one of the first projector apparatus or the second projector apparatus to emit an amount of pulsed light that is uniform on the entire screen to the projection object and directs at least one of the first distance image acquisition device or the second distance image acquisition device to acquire the first distance image and the second distance image of the first projection object and the second projection object, before the first projector apparatus and the second projector apparatus project the first projection image and the second projection image, respectively, in a case in which the static distance measurement mode is selected.

12. The projector apparatus with a distance image acquisition device according to claim 1, further comprising:
a distance measurement mode selection unit that selects a dynamic distance measurement mode; and
a control unit that directs the first projector apparatus and the second projector apparatus to continuously emit the first projection image and the second projection image as pulsed light to the first projection object and the second projection object, respectively, and directs the first distance image acquisition device and the second distance image acquisition device to continuously acquire the first distance image and the second distance image, respectively, in a case in which the dynamic distance measurement mode is selected.

13. The projector apparatus with a distance image acquisition device according to claim 1,
wherein each of the first to fourth bandpass optical filters has a transmission wavelength range of three primary colors of blue with a wavelength that is equal to or less than 480 nm, green with a wavelength that is equal to or greater than 500 nm and equal to or less than 580 nm, and red with a wavelength that is equal to or greater than 590 nm.

14. A projection mapping method using a projector apparatus with a distance image acquisition device including a first projector apparatus that projects a first projection image so as to be focused on a first projection object in a first focus range, a first distance image acquisition device that acquires first information which corresponds to a distance of the first projection object and corresponds to a time of flight of light to the first projection object and generates a first distance image on the basis of the acquired first information, a second projector apparatus that projects a second projection image so as to be focused on a second projection object in a second focus range closer than the first focus range, and a second distance image acquisition device that acquires second information which corresponds to a distance of the second projection object and corresponds to a time of flight of light to the second projection object and generates a second distance image on the basis of the acquired second information, the projection mapping method comprising:
a step of pulse-driving a first light source of the first projector apparatus to project the first projection image through a first bandpass optical filter having a transmission wavelength range of red, green, and blue;
a step of pulse-driving a second light source of the second projector apparatus to project the second projection image through a third bandpass optical filter having a transmission wavelength range of red, green, and blue which does not overlap the transmission wavelength range of the first bandpass optical filter;
a step of allowing the first distance image acquisition device to receive light reflected from the first projection object, which is reflected light with respect to the projected first projection image, through a second bandpass optical filter having the same characteristics as the first bandpass optical filter and to generate a first distance image corresponding to a distance of the first projection object;
a step of allowing the second distance image acquisition device to receive light reflected from the second projection object, which is reflected light with respect to the projected second projection image, through a fourth bandpass optical filter having the same characteristics as the third bandpass optical filter and to generate a second distance image corresponding to a distance of the second projection object;
a step of allowing the first projector apparatus to generate the first projection image which is projected to the first projection object and in which a portion other than a region corresponding to the first projection object is a black image on the basis of the first distance image; and a step of allowing the second projector apparatus to generate the second projection image which is projected to the second projection object and in which a portion other than a region corresponding to the second projection object is a black image on the basis of the second distance image, wherein the first distance image acquisition device and the second distance image acquisition device continuously generate the first distance image and the second distance image, respectively, and the first projector apparatus and the second projector apparatus continuously generate the first projection image and the second projection image, on the basis of the continuously generated first and second distance images, and project the continuously generated first and second projection images to the first projection object and the second projection object, respectively.

* * * * *